US009133359B2

(12) United States Patent
Haijima

(10) Patent No.: US 9,133,359 B2
(45) Date of Patent: Sep. 15, 2015

(54) MAINTENANCE LIQUID FOR INKJET RECORDING, INK SET FOR INKJET RECORDING, IMAGE FORMING METHOD, AND MAINTENANCE METHOD

(71) Applicant: FUJIFILM CORPORATION, Minato-ku, Tokyo (JP)

(72) Inventor: Akimitsu Haijima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/552,502

(22) Filed: Nov. 25, 2014

(65) Prior Publication Data

US 2015/0077465 A1 Mar. 19, 2015

Related U.S. Application Data

(63) Continuation of application No. PCT/JP2013/064670, filed on May 27, 2013.

(30) Foreign Application Priority Data

May 29, 2012 (JP) ................................. 2012-122537

(51) Int. Cl.
*B41J 2/01* (2006.01)
*C09D 11/38* (2014.01)
(Continued)

(52) U.S. Cl.
CPC ............. *C09D 11/38* (2013.01); *B41J 2/16552* (2013.01); *C08K 5/06* (2013.01); *C08K 5/3445* (2013.01); *C08K 5/3475* (2013.01); *C09D 11/322* (2013.01); *C09D 11/40* (2013.01); *C09D 11/54* (2013.01); *C09D 133/26* (2013.01); *C11D 1/72* (2013.01); *C11D 3/2068* (2013.01); *C11D 3/43* (2013.01); *C11D 11/0041* (2013.01)

(58) Field of Classification Search
CPC .. B41J 2/2107; B41J 2/16552; B41J 2/16517; B41J 29/17; B41J 2/211
See application file for complete search history.

(56) References Cited

U.S. PATENT DOCUMENTS 7,775,621 B2 * 8/2010 Chun .............................. 347/21
8,393,724 B2 * 3/2013 Imamura et al. ................ 347/96

FOREIGN PATENT DOCUMENTS

JP 2005-146224 A 6/2005
JP 2010-155905 A 7/2010
JP 2011-140556 A 7/2011

*Primary Examiner* — Lamson Nguyen
(74) *Attorney, Agent, or Firm* — Solaris Intellectual Property Group, PLLC

(57) ABSTRACT

A maintenance liquid for inkjet recording, including: a compound represented by the following Formula (I) and having an HLB value of from 10.5 to 13.8, a water-soluble organic solvent represented by the following Formula (II), a moisturizing agent, and water is disclosed. In the formulae, $R^1$ represents a straight chain or branched alkyl group having from 6 to 20 carbon atoms, a straight chain or branched alkenyl group having from 6 to 20 carbon atoms, or an aryl group; m represents an integer from 3 to 14, each of $R^3$ and $R^5$ independently represents a hydrogen atom or an alkyl group having from 1 to 4 carbon atoms, provided that $R^3$ and $R^5$ never represent a hydrogen atom at the same time; $R^4$ represents an ethylene group or a propylene group; and x represents an integer from 1 to 4.

$$R^1—O—(CH_2CH_2O)_m—H \quad \text{Formula (I)}$$

$$R^3\!\left(-OR^4\right)_x OR^5 \quad \text{Formula (II)}$$

10 Claims, 1 Drawing Sheet

(51) Int. Cl.

| | |
|---|---|
| ***C11D 1/72*** | (2006.01) |
| ***B41J 2/165*** | (2006.01) |
| ***C11D 3/20*** | (2006.01) |
| ***C11D 3/43*** | (2006.01) |
| ***C11D 11/00*** | (2006.01) |
| ***C09D 11/322*** | (2014.01) |
| ***C09D 11/40*** | (2014.01) |
| ***C09D 11/54*** | (2014.01) |
| ***C08K 5/06*** | (2006.01) |
| ***C08K 5/3445*** | (2006.01) |
| ***C08K 5/3475*** | (2006.01) |
| ***C09D 133/26*** | (2006.01) |

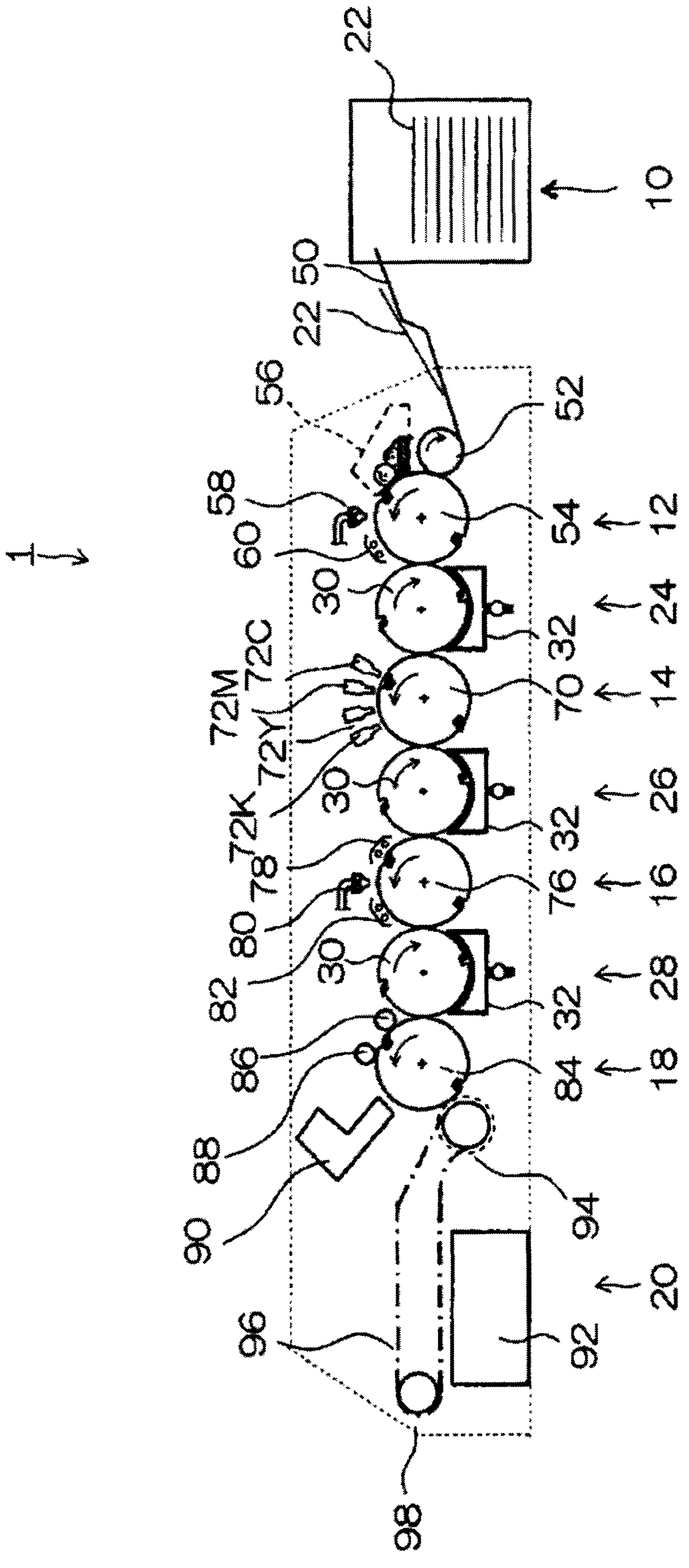
1
10
12
14
16
18
20
22
22
24
26
28
30
30
30
32
32
32
50
52
54
56
58
60
70
72C
72M
72Y
72K
76
78
80
82
84
86
88
90
92
94
96
98

MAINTENANCE LIQUID FOR INKJET RECORDING, INK SET FOR INKJET RECORDING, IMAGE FORMING METHOD, AND MAINTENANCE METHOD

CROSS-REFERENCE TO RELATED APPLICATIONS

This application is a continuation application of International Application No. PCT/JP2013/064670, filed May 27, 2013, the disclosure of which is incorporated herein by reference in its entirety. Further, this application claims priority from Japanese Patent Application No. 2012-122537, filed May 29, 2012, the disclosure of which is incorporated herein by reference in its entirety.

TECHNICAL FIELD

The present invention relates to a maintenance liquid for inkjet recording, an ink set for inkjet recording, an image forming method, and a maintenance method.

BACKGROUND ART

Recording methods utilizing inkjet methods allow recording of high-quality images on various recording media by, for example, ejecting droplets of inks from a number of nozzle holes arranged on an inkjet head. Therefore, recording methods utilizing inkjet methods are widely used.

For example, pigments are widely used as a colorant that is one of the components of an ink. The pigment is dispersed in a medium such as water, and used.

Pigment inks containing a pigment readily become viscous and gradually solidify due to evaporation of solvent components in the inks. When a pigment ink has solidified, it is hard to dissolve the inks again afterwards. Therefore, when thickening and solidification of ink proceeds, the ink is gradually accumulated on a nozzle tip portion of an inkjet head and the like, and as a result, the nozzle holes may become narrower or clogging may be caused, which leads to problems such as deviation in the ejection direction of ink or non-ejection. As such adhesion and accumulation of ink proceed, it becomes difficult to maintain the performance by using a nozzle cap, a wiping unit, or the like, and as a result, the image forming property over time is deteriorated.

Further, in a composition including a polymer component such as a polymer or wax in the ink for the purpose of, for example, improvement in rub resistance of the formed image or prevention of peeling, solidification and accumulation of ink as described above occur more easily.

In connection with the above circumstances, various investigations have been conducted concerning cleaning liquids (so-called maintenance liquids) for washing off inks. As a specific example of such cleaning liquids, a cleaning liquid for an inkjet recording apparatus, which includes a polyoxyalkylene monoalkyl ether having a substituent that includes a polyoxyalkylene moiety as a branched chain in the alkyl chain, has been disclosed (see, for example, Japanese Patent Application Laid-Open (JP-A) No. 2005-146224). Further, a cleaning liquid for an inkjet recording apparatus, which includes a polyoxyalkylene monoalkyl ether that includes more ethylene oxide chains than propylene oxide chains, has been disclosed (see, for example, JP-A No. 2011-140556).

In these documents, it is described that, by not washing the recording head but rather washing the flow channel where the ink of the inkjet recording apparatus flows with the cleaning liquid, and by the inclusion of a specific polyoxyalkylene monoalkyl ether, there is no problem with the ink refilling property after washing.

Moreover, an ink set that has an ink including polymer particles and a maintenance liquid including an aromatic ring-containing organic solvent has been disclosed, and a compound in which a phenyl group is bonded to an ethyleneoxy group or propyleneoxy group is described (see, for example, JP-A No. 2010-155905).

SUMMARY OF INVENTION

Technical Problem

Among the conventional cleaning techniques described above, the cleaning liquid for inkjet recording apparatus, which includes a polyoxyalkylene monoalkyl ether, is intended to prevent adverse effects, specifically, deterioration in pigment dispersibility, in a case in which the flow channel where the ink of the inkjet recording apparatus flows is washed with the cleaning liquid, rather than the recording head. Therefore, components are selected from the viewpoint of stably maintaining the dispersed state of a pigment in the ink even in a case in which the components are mixed with the ink after washing. However, such conventional cleaning techniques are not efficient in terms of cleaning performance with respect to ink-derived solids, and further improvement in the cleaning effect is required from the viewpoint of achieving a more stable image forming property.

Namely, when an ink is ejected, mistral granule ink may be generated, and this may adhere to the ejection head. The adhered granule ink may gradually solidify with time, and may adhere onto the head surface as granule solids (grains of dried ink). In the case of washing by applying a cleaning liquid to the ejection head, when the cleaning performance of the cleaning liquid with respect to the grains of dried ink (ink grains) that has adhered onto the head surface is not efficient, a phenomenon in which solids such as undissolved ink grains move and get into the ejection hole, thereby blocking the ejection hole, or accumulate in the vicinity of the ejection hole may be caused during wiping after washing. Such a phenomenon exerts adverse influence on the ejection of ink after washing, and resultantly causes ejection problems such as ink ejection deviation or non-ejection. Such a phenomenon prominently appears, especially in a case in which the ink includes a polymer component, in addition to a pigment.

The use of the above-described conventional cleaning liquid that includes a polyoxyalkylene monoalkyl ether is expected to exert a certain degree of effect in terms of washing the ink remaining in an undried state in the flow channel, while suppressing adverse influence on pigment dispersion, but is inferior in terms solubility of ink-derived solids that have been solidified due to drying as described above.

Further, the above conventional maintenance liquid containing an aromatic ring-containing organic solvent is not always sufficient in terms of solubility of ink-derived solids that have been solidified due to drying.

The invention has been made in view of the above circumstances and aims to accomplish the following. Namely, an object of the invention is to provide a maintenance liquid for inkjet recording, the maintenance liquid having excellent solubility with respect to ink-derived solids that have been solidified due to drying, an ink set for inkjet recording and an image forming method, with which ejection problems such as ink ejection deviation or non-ejection are suppressed and desired images are stably formed, and a maintenance method having high ink removing performance.

Solution to Problem

Specific means for attaining the above object are as follows.

<1> A maintenance liquid for inkjet recording, the maintenance liquid including: a compound represented by the following Formula (I) and having an HLB value of from 10.5 to 13.8; a water-soluble organic solvent represented by the following Formula (II); a moisturizing agent; and water.

$$R^1—O—(CH_2CH_2O)_m—H \quad \text{Formula (I)}$$

In Formula (I), $R^1$ represents a straight chain or branched alkyl group having from 6 to 20 carbon atoms, a straight chain or branched alkenyl group having from 6 to 20 carbon atoms, or an aryl group. m represents an integer from 3 to 14.

$$R^3—(OR^4)_x—OR^5 \quad \text{Formula (II)}$$

In Formula (II), each of $R^3$ and $R^5$ independently represents a hydrogen atom or an alkyl group having from 1 to 4 carbon atoms, provided that $R^3$ and $R^5$ never represent a hydrogen atom at the same time. $R^4$ represents an ethylene group or a propylene group. x represents an integer from 1 to 4.

<2> The maintenance liquid for inkjet recording according to <1>, wherein, in Formula (I), $R^1$ represents a straight chain or branched alkyl group having from 8 to 10 carbon atoms.

<3> The maintenance liquid for inkjet recording according to <1> or <2>, wherein a total content of the water-soluble organic solvent and the moisturizing agent is from 20% by mass to 40% by mass with respect to a total amount of the maintenance liquid for inkjet recording, and a mass ratio the water-soluble organic solvent to the moisturizing agent [water-soluble organic solvent:moisturizing agent] is from 1:1 to 1:100.

<4> The maintenance liquid for inkjet recording according to any one of <1> to <3> further including a basic compound having a pKa value of from 6.0 to 8.5.

<5> The maintenance liquid for inkjet recording according to any one of <1> to <4> further including a silicone based antifoaming agent.

<6> The maintenance liquid for inkjet recording according to any one of <1> to <5>, wherein, in Formula (I), $R^1$ represents a straight chain alkyl group having 10 carbon atoms, m represents an integer from 5 to 7, and the HLB value of the compound represented by Formula (I) is from 11.5 to 12.9.

<7> The maintenance liquid for inkjet recording according to any one of <1> to <6>, wherein the water-soluble organic solvent is at least one selected from the group consisting of diethylene glycol monobutyl ether, triethylene glycol monobutyl ether, diethylene glycol monoethyl ether, and dipropylene glycol monomethyl ether.

<8> The maintenance liquid for inkjet recording according to any one of <1> to <7>, wherein the moisturizing agent is at least one selected from the group consisting of glycerin, ethylene glycol, diethylene glycol, and triethylene glycol.

<9> An ink set for inkjet recording, the ink set including an ink composition that includes a pigment, polymer particles, and water, and the maintenance liquid for inkjet recording according to any one of <1> to <8>.

<10> The ink set for inkjet recording according to <9> further including a treatment liquid containing an aggregating component that causes aggregation of components in the ink composition.

<11> An image forming method using the ink set for inkjet recording according to <9> or <10> and including an ink application process of applying the ink composition to a recording medium by ejecting the ink composition from an inkjet recording head, and an ink removal process of removing the ink composition that has adhered to the inkjet recording head by using the maintenance liquid for inkjet recording.

<12> The image forming method according to <11> further including a treatment liquid application process of applying, to the recording medium, a treatment liquid containing an aggregating component that causes aggregation of components in the ink composition.

<13> A maintenance method including applying the maintenance liquid for inkjet recording according to any one of <1> to <8> to an ink ejection head for inkjet recording, to which an ink composition has adhered, thereby removing the ink composition from the inkjet recording head.

<14> A use of the maintenance liquid for inkjet recording according to any one of <1> to <8> in a maintenance method, wherein the maintenance method includes applying the maintenance liquid for inkjet recording to an ink ejection head for inkjet recording, to which an ink composition has adhered, thereby removing the ink composition from the inkjet recording head.

The term "maintenance" used in the present application includes in its scope an operation for maintaining (preserving) the inkjet recording head that ejects the ink composition for inkjet recording, and ejection performance thereof, which is to be retained in the primary state or close to the primary state, and an operation of washing (cleaning) the recording head for the purpose of adjusting and maintaining the recording head in a better state. The term "maintenance liquid" includes in its scope a cleaning liquid for washing the ink composition.

Advantageous Effects of Invention

According to the invention, a maintenance liquid for inkjet recording, the maintenance liquid having excellent solubility with respect to ink-derived solids that have been solidified due to drying, may be provided. Further, an ink set for inkjet recording and an image forming method may be provided, with which aggregation in a mixed liquid and thickening accompanying the aggregation are suppressed even if a maintenance liquid and an ink are mixed in the vicinity of the ejection port and the mixture is left as is and dried, and ejection problems such as ink ejection deviation or non-ejection are suppressed, and therefore desired images are stably formed.

BRIEF DESCRIPTION OF DRAWINGS

FIG. 1 is an entire configuration diagram schematically showing an example of an inkjet recording apparatus for carrying out the image forming method of the invention.

DESCRIPTION OF EMBODIMENTS

Hereinafter, a maintenance liquid for inkjet recording of the invention, an ink set for inkjet recording using the same, and an image forming method are described in detail.

Note that, in the case of referring to an amount of a component in the composition, when plural substances corresponding to the component exist in the composition, the amount means the total amount of the plural substances existing in the composition, unless defined specifically otherwise.

<Maintenance Liquid for Inkjet Recording>

The maintenance liquid for inkjet recording of the invention includes at least a compound represented by Formula (I) shown below, a water-soluble organic solvent represented by Formula (II) shown below, a moisturizing agent, and water. The maintenance liquid for inkjet recording of the invention may further include an organic solvent, a basic compound, other additives, or the like, if necessary.

In a case in which images are formed by ejecting ink from an inkjet recording head (hereinafter, may also referred to as, simply, "head" or "ejection head"), mistral granule ink may be generated at the time of the ejection, and when this granule ink adheres to the ejection head, the adhered granule ink including granule solids (dried ink) that have been solidified due to drying may accumulate on the head. In the case of washing by applying a cleaning liquid to the ejection head, when a conventional cleaning liquid is used, the solubility with respect to the ink-derived solids is not sufficient, and therefore, there is concern that granule ink-derived solids remaining on the head may move during the process of wiping or the like after washing, and thus, for example, the granule solids may get into the hole to block the ejection hole or the granule solids may be unevenly distributed in the vicinity of the hole to prevent ejection of ink.

In the invention, by the inclusion of a surfactant having an HLB value within a specific range and a specific structure, and a water-soluble organic solvent having an alkyleneoxy group and a specific structure, the solubility of the ink-derived solids is enhanced and excellent cleaning performance is exhibited, as compared with conventional cleaning liquids. For example, even in a case in which mistral granule ink that has dried and solidified exists on the head as granule solids, ejection problems such as ink ejection deviation or non-ejection, which are caused by blocking of the ejection hole in the process of wiping or the like after washing, accumulating in the vicinity of the hole, or the like, may be prevented. Thereby, a stable image forming property can be maintained over a long period of time.

Hereinafter, constituent components of the maintenance liquid for inkjet recording of the invention (hereinafter, also referred to as, simply, "maintenance liquid") and the like are described in detail.

(Compound Represented by Formula (I))

The maintenance liquid for inkjet recording of the invention includes at least one type of compound (surfactant) represented by the following Formula (I) and having an HLB value of from 10.5 to 13.8. This compound penetrates into the ink-derived solids and accelerates the solubility of the ink-derived solids. Thereby, ejection problem caused by ink-derived solids, which are produced when mistral ink generated at the time of ejection adheres to the ejection head and is dried, is prevented.

$$R^1—O—(CH_2CH_2O)_m—H \qquad \text{Formula (I)}$$

In Formula (I) above, $R^1$ represents a straight chain or branched alkyl group having from 6 to 20 carbon atoms, a straight chain or branched alkenyl group having from 6 to 20 carbon atoms, or a substituted or unsubstituted aryl group. m represents an integer from 3 to 14.

The alkyl group represented by $R^1$ has from 6 to 20 carbon atoms, and may have either a straight chain structure or a branched structure. Examples of the alkyl group include an octyl group, a nonyl group, a decyl group, a undecyl group, a dodecyl group, a tridecyl group, a tetradecyl group, a cetyl (hexadecyl) group, a stearyl (octadecyl) group, a nonadecyl group, and an icosyl group. Above all, a straight chain or branched alkyl group having from 8 to 10 carbon atoms is preferable, and a straight chain alkyl group having from 8 to 10 carbon atoms is particularly preferable.

The alkenyl group represented by $R^1$ has from 6 to 20 carbon atoms, and may have either a straight chain structure or a branched structure. Examples of the alkenyl group include an octenyl group, a nonenyl group, a decenyl group, a undecenyl group, a dodecenyl group, a tridecenyl group, a tetradecenyl group, a hexadecenyl group, an oleyl (octadecenyl) group, a nonadecenyl group, and an icosenyl group. Above all, an alkenyl group having from 8 to 10 carbon atoms is preferable.

The substituted or unsubstituted aryl group represented by $R^1$ is preferably a substituted aryl group, preferably an aryl group having from 10 to 20 carbon atoms, and more preferably an aryl group having from 12 to 16 carbon atoms. In a case in which the aryl group has a substituent, the substituent is preferably an alkyl group, an alkenyl group, or the like, more preferably an alkyl group, and particularly preferably an alkyl group having from 6 to 10 carbon atoms. Preferable examples of the aryl group include a nonylphenyl group and an octylphenyl group.

m represents an integer from 3 to 14. Above all, from the viewpoint of suppression of aggregation at the time of mixing the ink, m is preferably an integer from 4 to 8, more preferably an integer from 5 to 7, and particularly preferably an integer from 6 to 7. m can be arbitrary changed depending on the amount of epoxy to be added to the alkyl group.

Preferable examples of the compound represented by Formula (I) include the compounds in which $R^1$ represents a decyl group and m represents an integer from 6 to 7.

The HLB value of the compound represents by Formula (I) is from 10.5 to 13.8, and particularly preferably in a range of from 11.5 to 12.9. When the HLB value is less than 10.5, aggregation is likely to occur at the time of mixing the ink, and ejection defects may easily occur when the ink is dried with time. Meanwhile, when the HLB value is more than 13.8, the solubility of the ink-derived solids is lowered, resulting in deterioration in cleaning performance.

The "HLB value" in the invention is a value calculated according to the following Equation 1.

$$HLB = 20\times(\text{formula weight of polyethylene oxide group})/(\text{molecular weight}) \qquad \text{Equation 1}$$

Among the compounds represented by Formula (I) above, a compound in which $R^1$ represents a straight chain alkyl group having from 8 to 10 carbon atoms, m represents an integer from 4 to 8, and which has an HLB value of from 11.5 to 13.4 is preferable, and further, a compound in which $R^1$ represents a straight chain alkyl group having 10 carbon atoms, m represents an integer from 5 to 7, and which has an HLB value of from 11.5 to 12.9 is particularly preferable, from the viewpoints of suppression of aggregation at the time of mixing the ink, and the solubility of the ink-derived solids.

Specific examples of the compound represented by Formula (I) above are shown below. Note that, "PEG" represents "polyethylene glycol".

$R^1—O—(CH_2CH_2O)_m—H$

| Compound Name | $R^1$ | m | HLB |
|---|---|---|---|
| PEG (m = 3) monohexyl ether | $C_6H_{13}$ | 3 | 11.3 |
| PEG (m = 4) monohexyl ether | $C_6H_{13}$ | 4 | 12.7 |

-continued

| $R^1—O—(CH_2CH_2O)_m—H$ | | | |
|---|---|---|---|
| Compound Name | $R^1$ | m | HLB |
| PEG (m = 5) monohexyl ether | $C_6H_{13}$ | 5 | 13.7 |
| PEG (m = 4) monooctyl ether | $C_8H_{17}$ | 4 | 11.5 |
| PEG (m = 5) monooctyl ether | $C_8H_{17}$ | 5 | 12.6 |
| PEG (m = 6) monooctyl ether | $C_8H_{17}$ | 6 | 13.4 |
| PEG (m = 4) monodecyl ether | $C_{10}H_{21}$ | 4 | 10.5 |
| PEG (m = 6) monodecyl ether | $C_{10}H_{21}$ | 6 | 12.5 |
| PEG (m = 7) monodecyl ether | $C_{10}H_{21}$ | 7 | 13.2 |
| PEG (m = 8) monodecyl ether | $C_{10}H_{21}$ | 8 | 13.8 |
| PEG (m = 8) monolauryl ether | $C_{12}H_{25}$ | 8 | 13.1 |
| PEG (m = 8) cetyl ether | $C_{16}H_{33}$ | 8 | 11.8 |
| PEG (m = 10) cetyl ether | $C_{16}H_{33}$ | 10 | 12.9 |
| PEG (m = 8) oleyl ether | $C_{18}H_{35}$ | 8 | 11.3 |
| PEG (m = 10) oleyl ether | $C_{18}H_{35}$ | 10 | 12.4 |
| PEG (m = 12) oleyl ether | $C_{18}H_{35}$ | 12 | 13.2 |
| PEG (m = 8) icosyl ether | $C_{20}H_{41}$ | 8 | 10.8 |
| PEG (m = 12) icosyl ether | $C_{20}H_{41}$ | 12 | 12.8 |
| PEG (m = 6) nonylphenyl ether | $C_{15}H_{23}$ | 6 | 10.7 |
| PEG (m = 8) nonylphenyl ether | $C_{15}H_{23}$ | 8 | 12.1 |
| PEG (m = 8) octylphenyl ether | $C_{14}H_{21}$ | 8 | 12.4 |

The content of the compound represented by Formula (I) above in the maintenance liquid for inkjet recording is preferably from 0.1% by mass to 10% by mass, and more preferably from 0.5% by mass to 5% by mass, with respect to the total amount of the liquid. When the content of the compound represented by Formula (I) is 0.1% by mass or higher, the solubility of ink-derived solids (for example, granule ink resulting from mistral ink by drying and solidifying thereof) that have adhered onto the ejection head becomes favorable, and more excellent cleaning performance is realized. When the content of the compound is 10% by mass or lower, it is advantageous in terms of solubility in the maintenance liquid, and problems such as separation or turbidity are less likely to occur.

It is also possible to use two or more types of the compounds represented by Formula (I) by mixing them, if necessary.

(Water-Soluble Organic Solvent)

The maintenance liquid for inkjet recording of the invention contains at least one type of water-soluble organic solvent represented by the following Formula (II), together with the compound represented by Formula (I) above. By the inclusion of this water-soluble organic solvent, the solubility of the ink-derived solids is further improved, and more excellent cleaning ability is exhibited. The water-soluble organic solvent represented by the following Formula (II) also has an action of dissolving the compound represented by Formula (I) itself.

Formula (II)

$$R^3\text{—}(OR^4)_x\text{—}OR^5$$

In Formula (II) above, each of $R^3$ and $R^5$ independently represents a hydrogen atom or an alkyl group having from 1 to 4 carbon atoms, and $R^4$ represents an ethylene group or a propylene group. However, $R^3$ and $R^5$ never represent a hydrogen atom at the same time. x represents an integer from 1 to 4.

Examples of the alkyl group having from 1 to 4 carbon atoms, which is represented by $R^3$ or $R^5$, include a methyl group, an ethyl group, an n-propyl group, an iso-propyl group, an n-butyl group, a sec-butyl group, and a tert-butyl group.

Examples of the water-soluble organic solvent represented by Formula (II) above include ethylene glycol monomethyl ether, ethylene glycol monoethyl ether, ethylene glycol monobutyl ether, diethylene glycol monomethyl ether (DEGmME/SP value: 23.0), diethylene glycol monoethyl ether (DEGmEE/SP value: 22.4), diethylene glycol monobutyl ether (DEGmBE/SP value: 21.5), triethylene glycol monomethyl ether (TEGmME/SP value: 19.6), triethylene glycol monoethyl ether (TEGmEE/SP value: 19.4), triethylene glycol monobutyl ether (TEGmBE/SP value: 21.1), propylene glycol monomethyl ether, propylene glycol monobutyl ether, dipropylene glycol monomethyl ether (DPGmME/SP value: 21.3), tripropylene glycol monomethyl ether (TPGmME/SP value: 21.3), dipropylene glycol (DPG/SP value: 27.2), $nC_4H_9O(AO)_4$—H (AO=EO or PO, EO:PO [mass ratio]=1:1, SP value: 20.1), and $HO(PO)_3$—H (SP value: 24.7). Among the water-soluble organic solvents represented by Formula (II) above, diethylene glycol monobutyl ether is most preferable, from the viewpoint of enhancing the solubility of the ink-derived solids and the solubility of the compound represented by Formula (I).

The water-soluble organic solvents represented by Formula (II) above may be used singly or in combination of two or more kinds thereof.

The content of the water-soluble organic solvent represented by Formula (II) in the maintenance liquid for inkjet recording is preferably from 0.3% by mass to 20% by mass, and more preferably from 1% by mass to 10% by mass. When the addition amount is lower than 0.2% by mass, the effect of improvement in the solubility of ink-derived solids is small, and when the addition amount exceeds 20% by mass, aggregation easily occur at the time of mixing the ink, which is thus not preferable.

The content ratio of the water-soluble organic solvent represented by Formula (II) above relative to the surfactant represented by Formula (I) described above (water-soluble organic solvent: surfactant/mass ratio) is preferably from 1:50 to 50:1, more preferably from 1:10 to 10:1, and still more preferably from 1:3 to 3:1. When the content ratio is within the above range, the solubility of ink-derived solids can be further enhanced, and further, the solubility of the compound represented by Formula (I) in the maintenance liquid can also be enhanced.

Other than the above, a compound represented by the following Structural Formula (1) may be added as the water-soluble organic solvent to the extent of not impairing the effects of the invention.

Structural Formula (I)

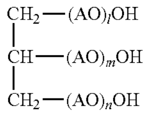

In Structural Formula (1), l, m, and n each independently represent an integer of 1 or more, and satisfy l+m+n=3 to 15. When the value of l+m+n is 3 or more, a favorable cleaning performance and favorable curl suppressing effect may be exhibited, and when the value of l+m+n is 15 or less, a favorable ejection property may be maintained. Above all, l+m+n is preferably from 3 to 12, and more preferably from 3 to 10. AO represents an ethyleneoxy (EO) group and/or a propyleneoxy (PO) group, and among them, a propyleneoxy group is preferable. Each AO in $(AO)_l$, $(AO)_m$, and $(AO)_n$ in the structural formula may be the same or different.

Examples of the compound represented by Structural Formula (1) above include the following compounds. Note that, the numerical values in parentheses are the SP values.

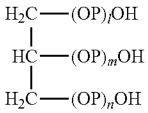
l + m + n = 3
(26.4)
OP = propyleneoxy

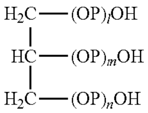
l + m + n = 4
(24.9)
OP = propyleneoxy

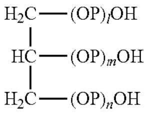
l + m + n = 5
(23.9)
OP = propyleneoxy

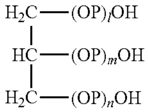
l + m + n = 6
(23.2)
OP = propyleneoxy

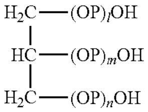
l + m + n = 7
(22.6)
OP = propyleneoxy

As the compound represented by Structural Formula (1) above, commercially available products currently marketed may be used. Examples may include, as polyoxypropylated glycerin (ether of propylene glycol and glycerin), SANNIX GP-250 (average molecular weight of 250), SANNIX GP-400 (average molecular weight of 400), and SANNIX GP-600 (average molecular weight of 600) [all manufactured by Sanyo Chemical Industries, Ltd.].

In the invention, in a case in which the maintenance liquid contains an additional organic solvent other than the water-soluble organic solvent represented by Formula (II) above, it is preferable that the additional organic solvent is an organic solvent having an SP value of 27.5 or less, from the viewpoint of the solubility of ink-derived solids.

It is preferable that the maintenance liquid of the invention contains an organic solvent having an SP value of 27.5 or less in an amount of 50% by mass or higher with respect to the total amount of organic solvents. When the content of the organic solvent having an SP value of 27.5 or less is 50% by mass or higher, the solubility of ink-derived solids on the ejection head is further enhanced, and the cleaning performance can be further enhanced. The content of the organic solvent is more preferably 60% by mass or higher, still more preferably 70% by mass or higher, and particularly preferably 80% by mass or higher. Further, it is preferable that the water-soluble organic solvent represented by Formula (II) above is contained within the above range.

From the viewpoint of improvement in the solubility of ink-derived solids, the SP value is preferably 24 or less, and more preferably 22 or less.

The maintenance liquid of the invention may contain other organic solvent, other than the water-soluble organic solvent represented by Formula (II) above or the compound represented by Structural Formula (1) above. Examples of the organic solvent include water-soluble organic solvents such as alcohols, polyols which can be used as the moisturizing agent described below, or ethers. Specific examples of the alcohols include straight chain or branched alkyl alcohols such as ethanol, butanol, or isopropanol. Specific examples of the ethers include alkyl ethers such as diethyl ether, dibutyl ether, ethyl methyl ether, dihexyl ether, or furan. Examples of the water-soluble organic solvents may further include lactams which can be used as the moisturizing agent described below, 1,3-dimethyl-2-imidazolidinone, formamide, acetamide, dimethyl sulfoxide, sorbitol, sorbitane, acetine, diacetine, triacetine, and sulfolane.

These water-soluble organic solvents may be used singly, or in combination of plural kinds thereof.

The solubility parameter (SP value) is a value represented by the square root of the molecular cohesive energy and is a value calculated by the method described in R. F. Fedors, Polymer Engineering Science, 14, pages 147 to 154 (1967).

The total content of organic solvents in the maintenance liquid for inkjet recording of the invention is preferably in a range of from 1% by mass to 50% by mass with respect to the total mass of the maintenance liquid, from the viewpoint of cleaning performance. The percentage of the water-soluble organic solvent represented by Formula (II) above relative to the total organic solvent being 50% by mass or higher is preferable in view of improvement in the solubility of ink-derived solids.

(Moisturizing Agent)

It is preferable that the maintenance liquid for inkjet recording of the invention includes at least one type of moisturizing agent. By including a moisturizing agent, drying due to evaporation of moisture of the maintenance liquid can be suppressed, and change in quality of the composition of the maintenance liquid, when the maintenance liquid is left for a long time, can be suppressed.

The term "moisturizing agent" refers to a water-soluble compound which has low volatility and has a relatively high moisture-holding capacity.

Examples of the moisturizing agent include polyols (examples thereof including glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, pentaerythritol, and the like), lactams (examples thereof including 2-pyrrolidone, N-methyl-2-pyrrolidone, and the like), and water-soluble solid moisturizing agents (examples thereof including nitrogen compounds such as urea, thiourea, or N-ethylurea; diols such as 1,6-hexanediol, 1,8-octanediol, 2,2-dimethyl-1,3-propanediol, or 2,2-diethyl-1,3-propanediol; trimethylolethane, trimethylolpropane, or the like; monosaccharides, disaccharides, oligosaccharides, and polysaccharides, derivatives of any of these saccharides, such as reducing sugars, oxidized sugars, amino acids, or thiosugar, such as glucose, mannnose, fructose, ribose, xylose, arabinose, galactose, aldonic acid, glucitol (sorbitol), maltose, cellobiose, lactose, sucrose, trehalose, or maltotriose). Among them, as the moisturizing agent to be used in the invention, polyols are preferable, glycerin, ethylene glycol, diethylene glycol, and triethylene glycol are more preferable, and diethylene glycol is most preferable.

The content of the moisturizing agent in the maintenance liquid for inkjet recording is preferably in a range of from 10% by mass to 40% by mass, and particularly preferably from 16% by mass to 30% by mass, with respect to the total amount of the maintenance liquid. When the content of the moisturizing agent is 10% by mass or higher, drying due to evaporation of moisture of the maintenance liquid is suppressed. When the content of the moisturizing agent is 40% by mass or lower, lowering of fluidity due to an increase in the viscosity is prevented, and also, favorable cleaning performance can be ensured.

It is particularly preferable that the total content of the water-soluble organic solvent represented by Formula (II) and the moisturizing agent is from 20% by mass to 40% by mass, with respect to the total amount of the maintenance liquid. Further, the mass ratio of the water-soluble organic solvent to the moisturizing agent is preferably from 1:1 to 1:100, more preferably from 1:2 to 1:9, and particularly preferably from 1:3 to 1:5. This range is preferable from the viewpoints of the solubility of the compound represented by Formula (I) according to the invention and suppression of aggregation of the ink mixed liquid at the time of drying.

(Water)

The maintenance liquid for inkjet recording of the invention includes water as the solvent.

Regarding preferable water, for the purpose of reducing the amount of ionic impurities as low as possible, pure water such as ion exchanged water, ultra-filtered water, reverse osmosis water, or distilled water, or ultrapure water can be used.

The proportion of water in the total mass of the maintenance liquid is preferably in a range of from 50% by mass to 80% by mass, and more preferably in a range of from 60% by mass to 70% by mass.

(Basic Compound)

The maintenance liquid for inkjet recording of the invention preferably contains at least one type of basic compound. By including a basic compound, a maintenance liquid which has a buffer action for preventing lowering of pH due to decomposition of the components or the like, in a case in which the maintenance liquid is aged due to storage or the like, can be obtained.

The basic compound in the invention is not particularly limited as long as the compound has a pH buffer capacity within the pH region of the maintenance liquid, and is preferably a compound having a degree of solubility of 5 mmol/L or more with respect to the solvent (for example, water, an organic solvent, or a mixed solvent thereof) included in the maintenance liquid.

The basic compound is preferably a compound having a pKa value in a range of from 6.0 to 8.5, and more preferably a compound having a pKa value in a range of from 6.8 to 8.3, in view of effectively exhibiting a pH buffer capacity within the pH region of the maintenance liquid.

The basic compound may be either an inorganic compound or an organic compound. From the viewpoints of ease of obtaining a desired pKa value and having favorable solubility in the maintenance liquid, an organic basic compound is preferable as the basic compound. The basic compound may be either a monobasic compound or a polybasic compound. Here, the pKa value of an organic basic compound is the pKa value of the conjugate acid.

Specific examples of the basic compound include the following compounds.

Cacodylic acid (pKa: 6.2)

2,2-Bis(hydroxymethyl)-2,2',2"-nitrilotriethanol (pKa: 6.5)

Piperazine-N,N'-bis(2-ethanesulfuric acid) (pKa: 6.8)

Phosphoric acid (pKa2: 6.86)

Imidazole (pKa: 7.0)

N'-2-Hydroxyethylpiperazine-N',2-ethanesulfuric acid (pKa: 7.6)

N-Methylmorpholine (pKa: 7.8)

Triethanolamine (pKa: 7.8)

Hydrazine (pKa: 8.11)

Tris(hydoxymethyl)aminomethane (pKa: 8.3)

The content of the basic compound in the maintenance liquid for inkjet recording is preferably in a range of from 0.01% by mass to 10% by mass, and more preferably in a range of from 0.1% by mass to 5% by mass, with respect to the total amount of the maintenance liquid. When the content of the basic compound is 0.01% by mass or higher, the variation in the pH of the maintenance liquid is suppressed, and the occurrence of aggregation of the components in the ink or the like is effectively prevented, in the case of being mixed with the ink after washing. The content of 10% by mass or lower is advantageous in that separation is less likely to occur when the maintenance liquid is condensed at the head surface.

(Antifoaming Agent)

It is preferable that the maintenance liquid for inkjet recording of the invention includes an antifoaming agent. Examples of the antifoaming agent include a silicone based compound and a PLURONIC (registered trademark) type compound. Above all, it is more preferable to include a silicone based antifoaming agent. As the silicone based antifoaming agent, a compound having a polysiloxane structure is preferable, and BYK-024 manufactured by BYK Japan K.K. is particularly preferable.

(Other Additives)

The maintenance liquid for inkjet recording of the present invention may contain, if necessary, in addition to the components described above, other additives such as an antifading agent, an emulsification stabilizer, a penetration accelerator, an ultraviolet absorbent, an antirust agent, an antiseptic, a mildew proofing agent, a pH adjusting agent, a surface tension adjusting agent (a nonionic surfactant, a cationic surfactant, an anionic surfactant, a betaine surfactant, or the like), a viscosity adjusting agent, or a silicone based compound described in JP-A No. 2011-63777.

The maintenance liquid for inkjet recording of the present invention may further include a surfactant other than the compound represented by Formula (I) described above, as a surface tension adjusting agent.

Preferable examples of the surfactant include anionic surfactants such as a fatty acid salt, an alkylcarboxylic acid salt, an alkyl sulfuric acid ester salt, an alkylsulfonic acid salt, an alkylbenzenesulfonic acid salt, an alkylnaphthalenesulfonic acid salt, a dialkylsulfosuccinic acid salt, an alkyl phosphoric acid ester salt, a naphthalenesulfonic acid-formalin condensate, or a polyoxyethylene alkyl sulfuric acid ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, an acetylenediol derivative, polyoxyethylene alkyl amine, glycerin fatty acid ester, and an oxyethylene oxypropylene block copolymer. In the case of including such a surfactant, the content thereof in the maintenance liquid is preferably from 0.5% by mass to 10% by mass, with respect to the total amount of the maintenance liquid, in view of cleaning performance.

The pH of the maintenance liquid in the invention is preferably from 7.0 to 9.5, more preferably from 7.5 to 9.0, and particularly preferably from 8.0 to 8.8.

When the pH of the maintenance liquid is too low, aggregation easily occurs when mixed with the ink composition according to the invention. When the pH is too high, the liquid repellent film of the head tends to deteriorate easily.

From the viewpoint of working property, the viscosity of the maintenance liquid at 25° C. is preferably from 1 mPa·s to 50 mPa·s, more preferably 1 mPa·s or more but less than 10 mPa·s, and still more preferably 2 mPa·s or more but less than 5 mPa·s.

The viscosity is a value measured at 25° C. using a VISCOMETER TV-22 (manufactured by TOKI SANGYO CO., LTD.).

It is preferable that the maintenance liquid of the invention is a colorless liquid that does not contain a pigment.

The solid content (at 25° C.) in the maintenance liquid is not particularly limited, but from the viewpoint of preventing remaining of solid after washing, the solid content is preferably 5% by mass or lower, and more preferably 2% by mass or lower.

<Ink Set for Inkjet Recording>

The ink set for inkjet recording of the invention is configured to include an ink composition including a pigment, polymer particles, and water, and the maintenance liquid for inkjet recording of the invention described above. The ink set for inkjet recording of the invention can be preferably configured to further include a treatment liquid containing an aggregating component that causes aggregation of components in the ink composition.

By having such a configuration that the ink set for inkjet recording of the invention includes the maintenance liquid for inkjet recording described above, the solubility of ink that easily adheres to the surface of the ink ejection head, because of containing a pigment and polymer particles, and is hardly dissolved or removed after drying, especially, ink-derived solid that has been solidified due to drying, is excellent, and thus a stable image forming property is retained over a long period of time. Namely, even in a case in which, for example, mistral granule ink has adhered and is solidified due to drying and thus granule ink exists on the head surface, a phenomenon in which the granule ink blocks the ejection hole or accumulates in the vicinity of the ejection hole, during the process of wiping or the like after washing, may be prevented.

—Ink Composition—

The ink composition in the invention is configured to include a pigment, polymer particles, and water, and may further include, if necessary, additives such as urea or a derivative thereof, wax, or a surfactant.

(Pigment)

The pigment in the invention is not particularly limited in its kind, and any of conventionally known organic pigments and inorganic pigments can be used. Examples of the pigment include organic pigments such as polycyclic pigments, such as an azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment; dye lakes, such as a basic dye type lake or an acidic dye type lake; nitro pigments; nitroso pigments; aniline black; or daylight fluorescent pigments; and inorganic pigments such as titanium oxide, an iron oxide type pigment, and a carbon black type pigment. Even a pigment that is not described in Color Index can be used so long as the pigment is capable of being dispersed in an aqueous phase. Moreover, those obtained by subjecting the above pigments to a surface treatment with a surfactant, a polymer dispersant, or the like; graft carbon; or the like can also be used. Among the above pigments, particularly, an azo pigment, a phthalocyanine pigment, an anthraquinone pigment, a quinacridone pigment, or a carbon black type pigment is preferably used. Specific examples include the pigments described in JP-A No. 2007-100071.

(Dispersant)

In the ink composition, it is preferable that at least a part of the pigment contained as a coloring material is dispersed in an aqueous solvent as coloring material particles coated with a dispersant. Specifically, it is preferable that a part or all of the pigment is coated with a water-insoluble polymer and dispersed in a liquid. In this case, it is not always necessary that the entire surface of the pigment particle is coated, and in some cases, the pigment may be in a state in which at least a portion of the particle surfaces is coated.

The dispersant may be a polymer dispersant or a low molecular weight surfactant type dispersant. The polymer dispersant is preferably a water-insoluble polymer dispersant. This water-insoluble polymer is not particularly limited as long as the polymer can disperse a pigment, and a conventionally known water-insoluble polymer can be used. For example, the water-insoluble polymer may be configured to include both a hydrophobic constituent unit and a hydrophilic constituent unit.

Here, the term "water-insoluble" means that, when a polymer is mixed with an aqueous medium at 25° C., the amount of the polymer that dissolves in the aqueous medium is 10% by mass or less, expressed as the mass ratio relative to the total polymer mixed with the aqueous medium.

The water-insoluble polymer may be a polymer containing a repeating unit (a) represented by the following Formula (1) and a repeating unit (b) having an ionic group. This polymer may further contain, if necessary, one or more other structural units such as another hydrophobic repeating unit other than the repeating unit (a) or a hydrophilic repeating unit having a nonionic functional group.

<Repeating Unit (a) Represented by Formula (1)>

Formula (I)

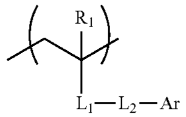

In Formula (1), $R_1$ represents a hydrogen atom, a methyl group, or a halogen atom (for example, a chlorine atom, a bromine atom, an iodine atom, or the like); $L_1$ represents *—COO—, *—OCO—, *—CONR$_2$—, *—O—, or a substituted or unsubstituted phenylene group; and $R_2$ represents a hydrogen atom or an alkyl group having from 1 to 10 carbon atoms. Herein, the "*" sign in the groups represented by $L_1$ represents a bonding site to bond to the main chain. $L_2$ represents a single bond or a divalent linking group. Ar represents a monovalent group derived from an aromatic ring.

In Formula (1) above, $R_1$ represents a hydrogen atom, a methyl group, or a halogen atom, and preferably represents a methyl group.

$L_1$ represents *—COO—, *—OCO—, *—CONR$_2$—, *—O—, or a substituted or unsubstituted phenylene group. In a case in which $L_1$ represents a phenylene group, the phenylene group is preferably an unsubstituted phenylene group. $R_2$ represents a hydrogen atom or an alkyl group having from 1 to 10 carbon atoms.

$L_2$ represents a single bond or a divalent linking group. The divalent linking group is preferably a linking group having from 1 to 30 carbon atoms, more preferably a linking group having from 1 to 25 carbon atoms, still more preferably a linking group having from 1 to 20 carbon atoms, and particularly preferably a linking group having from 1 to 15 carbon atoms.

Above all, an alkyleneoxy group having from 1 to 25 carbon atoms (more preferably, having from 1 to 10 carbon atoms), an imino group (—NH—), a sulfamoyl group, a divalent linking group containing an alkylene group, such as an alkylene group having from 1 to 20 carbon atoms (more preferably, having from 1 to 15 carbon atoms) or an ethylene oxide group [—$(CH_2CH_2O)_n$—, n=1 to 6], and a group obtained by combining two or more types of linking groups selected from the above, and the like are most preferable.

Ar represents a monovalent group derived from an aromatic ring. The aromatic ring of the monovalent group represented by Ar is not particularly limited, and examples thereof include a benzene ring, a condensed aromatic ring having 8 or more carbon atoms, and a heterocycle-condensed aromatic ring.

The expression "condensed aromatic ring having 8 or more carbon atoms" refers to an aromatic ring in which two or more benzene rings are condensed with each other, or an aromatic compound having 8 or more carbon atoms in which an alicyclic hydrocarbon is condensed with at least one type of aromatic ring to form a ring. Specific examples include naphthalene, anthracene, fluorene, phenathrene, and acenaphthene.

The term "heterocycle-condensed aromatic ring" refers to a compound in which a heteroatom-containing cyclic compound is condensed with an aromatic compound that does not contain a heteroatom (preferably, a benzene ring). Here, the heteroatom-containing cyclic compound is preferably a 5-membered ring or a 6-membered ring. The heteroatom is preferably a nitrogen atom, an oxygen atom, or a sulfur atom. The heteroatom-containing cyclic compound may have plural heteroatoms. In this case, the heteroatoms may be the same as or different from each other.

Specific examples of the heterocycle condensed with an aromatic ring include phthalimide, acridone, carbazole, benzoxazole, and benzothiazole.

Specific examples of a monomer that forms the repeating unit (a) represented by Formula (1) above include vinyl monomers such as (meth)acrylate, (meth)acrylamide, styrene, or a vinyl ester.

In the invention, the repeating unit (a) represented by Formula (1) has a structure in which the aromatic ring is bonded to an atom in the main chain of the water-insoluble polymer through a linking group and does not directly bond to an atom in the main chain of the water-insoluble polymer. Therefore, a suitable distance is maintained between the hydrophobic aromatic ring and the hydrophilic structural unit, and thus, an interaction between the water-insoluble polymer and the pigment is likely to be generated, resulting in achieving strong adsorption to further improve the dispersibility.

Furthermore, specific examples of the monomer that forms the repeating unit (a) represented by Formula (1) above may include the following monomers. However, it should be construed that the invention is not limited to these specific examples.

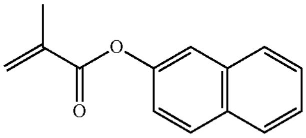

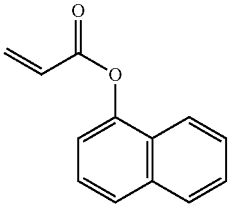

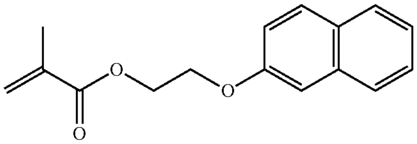

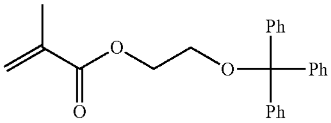

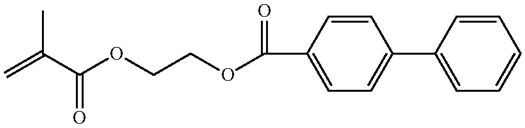

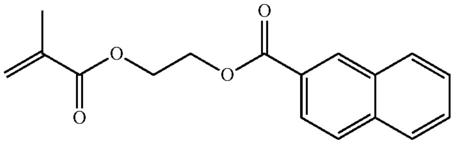

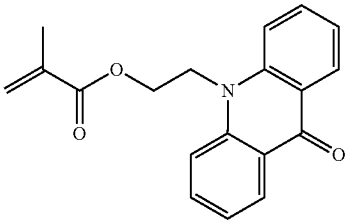

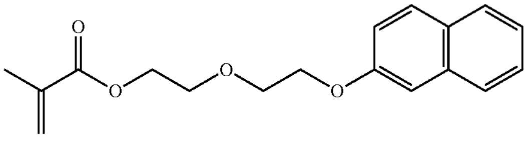

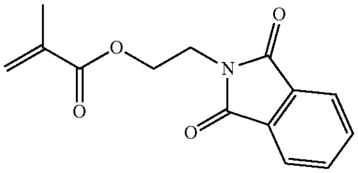

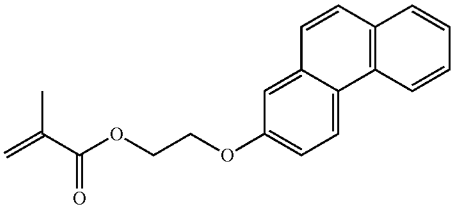

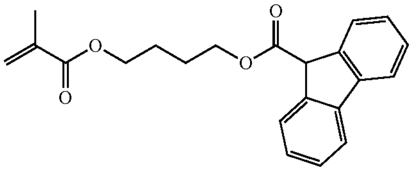

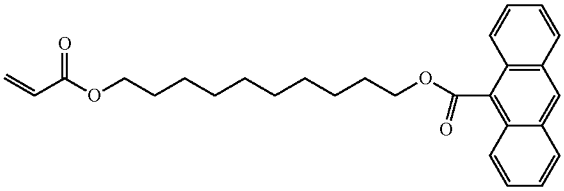

-continued

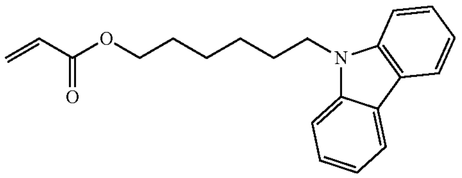
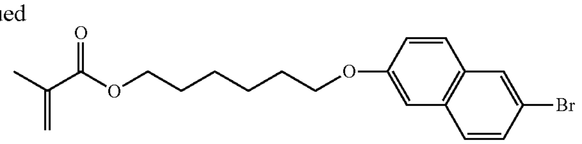
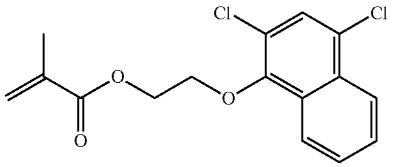
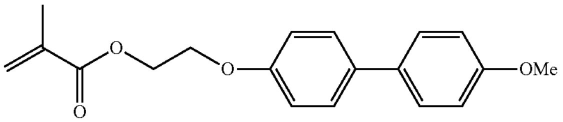
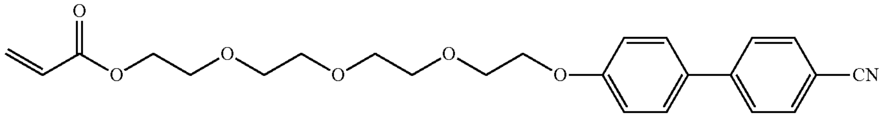
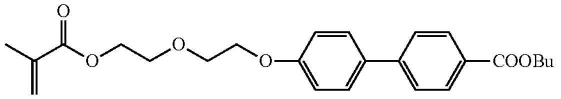
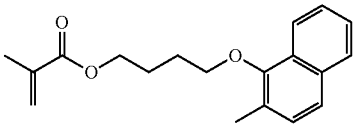
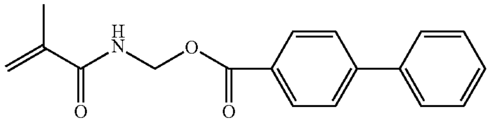
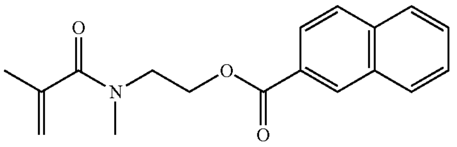
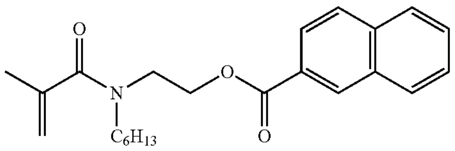
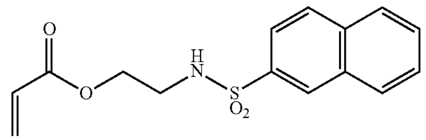
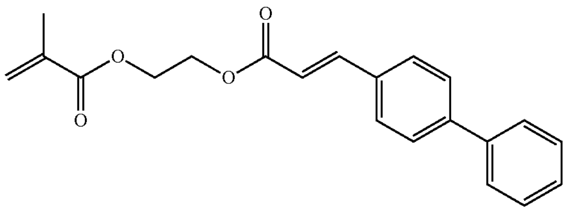
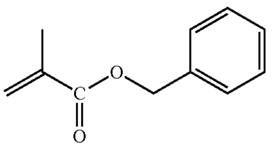
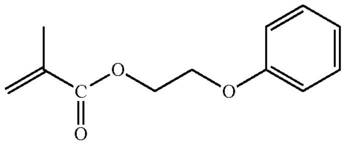
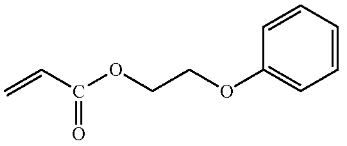

From the viewpoint of the dispersion stability of the coated pigment, the repeating unit (a) represented by Formula (1) above is preferably benzyl (meth)acrylate, phenoxyethyl acrylate, phenoxyethyl methacrylate, or those in which Ar in Formula (1) represents a monovalent group derived from acridone or phthalimide.

One kind of the repeating unit may be used singly, or two or more kinds thereof may be used in mixture.

The content ratio of the repeating unit (a) represented by Formula (1) above in the polymer is preferably in a range of from 5% by mass to 25% by mass, and more preferably in a range of from 10% by mass to 18% by mass, with respect to the total mass of the polymer. When this content ratio is 5% by mass or higher, there is a tendency that generation of image defects such as white spots or the like can be remarkably suppressed, and when the content ratio is 25% by mass or lower, problems in terms of production suitability which may be caused by the decrease in solubility of the polymer in the polymerization reaction liquid (for example, methyl ethyl ketone) tend to hardly arise, which is thus preferable.

<Additional Hydrophobic Repeating Unit>

The water-insoluble polymer may further include, as a hydrophobic structural unit, one or more additional hydrophobic repeating units other than the repeating unit represented by Formula (1) above. Examples of the additional hydrophobic repeating units may include structural units derived from a vinyl monomer such as a (meth)acrylate, a (meth)acrylamide, a styrene, or a vinyl ester, each of which does not belong to hydrophilic structural units (for example, each of which does not have a hydrophilic functional group), and structural units derived from a hydrophobic structural unit having an aromatic ring which is bonded to an atom in the main chain through a linking group. One kin of these structural units may be used singly, or two or more kinds thereof may be used in mixture.

Examples of the (meth)acrylate include alkly (meth)acrylates such as methyl (meth)acrylate, ethyl(meth)acrylate, butyl(meth)acrylate, isobutyl(meth)acrylate, or hexyl(meth) acrylate. Above all, an alkyl ester of (meth)acrylic acid in which the alkyl moiety has from 1 to 4 carbon atoms is preferable. Specifically, methyl(meth)acrylate, ethyl(meth) acrylate, and butyl(meth)acrylate are preferable, and methyl (meth)acrylate and ethyl(meth)acrylate are particularly preferable.

Further, examples of the (meth)acrylamide, styrene, and vinyl ester include the compounds described in paragraphs [0063] to [0065] of JP-A No. 2001-162692.

<Repeating Unit (b) Having Ionic Group>

Examples of the repeating unit (b) having an ionic group include repeating units derived from a monomer having an ionic group such as a carboxyl group, a sulfo group, or a phosphonato group. Examples may include vinyl monomers having an ionic functional group, such as (meth)acrylic acid, (meth)acrylates, (meth)acrylamides, or vinyl esters. The repeating unit having an ionic group can be introduced by polymerization of the corresponding monomer. The repeating unit having an ionic group may be obtained by introducing an ionic group into the polymer chain after polymerization. Among the above repeating units having an ionic group, a repeating unit derived from acrylic acid or methacrylic acid is preferable. It is preferable that the water-insoluble polymer contains a structural unit derived from acrylic acid or a structural unit derived from methacrylic acid, or both.

In a preferable embodiment, the proportion of the repeating unit (b) having an ionic group in this polymer is 15% by mass or lower with respect to the total mass of the polymer, and this polymer contains at least a structural unit derived from (meth) acrylic acid as the repeating unit having an ionic group. When the content of the repeating unit (b) having an ionic group is 15% by mass or lower with respect to the total mass of the polymer, excellent dispersion stability is realized. The proportion of the repeating unit (b) having an ionic group is preferably from 5% by mass to 15% by mass, and more preferably from 7% by mass to 13% by mass, from the viewpoint of dispersion stability.

This polymer can stably exist in an aqueous ink composition, and has excellent properties in terms, for example, of suppression of adhesion and accumulation of aggregates onto the inkjet head or the like, and of the removability of adhered aggregates. From such viewpoints, this polymer may further have a hydrophobic structural unit other than the repeating unit (a) represented by Formula (1) above, and an additional hydrophilic structural unit other than the "repeating unit (b) having an ionic group" described above.

<Hydrophilic Repeating Unit>

An example of the additional hydrophilic structural unit is a repeating unit derived from a monomer having a nonionic hydrophilic group. Specifically, examples thereof may include vinyl monomers having a hydrophilic functional group, such as a (meth)acrylate, a (meth)acrylamide, or a vinyl ester, each of which has a hydrophilic functional group.

Examples of the "hydrophilic functional group" include a hydroxyl group, an amino group, an amido group (in which the nitrogen atom is unsubstituted), and alkylene oxide such as polyethylene oxide, polypropylene oxide, or the like, which are described below.

The monomer that forms a hydrophilic repeating unit having a nonionic hydrophilic group is not particularly limited as long as the monomer has a functional group capable of forming a polymer, such as an ethylenically unsaturated bond, and a nonionic hydrophilic functional group, and can be selected as appropriate from known monomers. Preferable examples thereof may include, specifically, hydroxyethyl(meth)acrylate, hydroxybutyl(meth)acrylate, (meth)acrylamide, aminoethyl acrylate, aminopropyl acrylate, and a (meth)acrylate that contains an alkylene oxide polymer.

The hydrophilic repeating unit having a nonionic hydrophilic group can be formed by polymerization of the corresponding monomer. The hydrophilic repeating unit may be formed by introducing a hydrophilic functional group into the polymer chain after polymerization.

The hydrophilic repeating unit having a nonionic hydrophilic group is more preferably a hydrophilic structural unit having an alkylene oxide structure. The alkylene moiety of the alkylene oxide structure is preferably an alkylene having from 1 to 6 carbon atoms, more preferably an alkylene having from 2 to 6 carbon atoms, and particularly preferably an alkylene having from 2 to 4 carbon atoms, from the viewpoint of hydrophilicity. Further, the polymerization degree of the alkylene oxide structure is preferably from 1 to 120, more preferably from 1 to 60, and particularly preferably from 1 to 30.

It is also preferable that the hydrophilic repeating unit having a nonionic hydrophilic group is a hydrophilic repeating unit containing a hydroxyl group. The number of hydroxyl groups in the repeating unit is not particularly limited, and is preferably from 1 to 4, more preferably from 1 to 3, and particularly preferably from 1 to 2, from the viewpoints of the hydrophilicity of the water-insoluble polymer and mutual solubility with the solvent or other monomers at the time of polymerization.

In the water-insoluble polymer, the composition of the hydrophilic repeating units and the hydrophobic repeating units (including the repeating unit represented by Formula (1) above) depends on the degrees of the hydrophilicity and hydrophobicity of these components, but it is preferable that the proportion of the hydrophilic repeating units is 15% by mass or lower, with respect to the mass of the water-insoluble polymer. Here, the proportion of the hydrophobic repeating units is preferably higher than 80% by mass, and more preferably 85% by mass or higher, with respect to the total mass of the water-insoluble polymer. When the content of the hydrophilic repeating units is 15% by mass or lower, the amount of components which singly dissolves in an aqueous medium is decreased, which results in the improvement in various properties in terms of pigment dispersion and the like, whereby a favorable ink ejection property can be obtained at the time of inkjet recording. The content ratio of the hydrophilic repeating units is preferably higher than 0% by mass but 15% by mass or lower, more preferably from 5% by mass to 15% by mass, and particularly preferably from 8% by mass to 12% by mass, with respect to the total mass of the water-insoluble polymer.

The content ratio of aromatic rings contained in the water-insoluble polymer is preferably 27% by mass or lower, more preferably 25% by mass or lower, and still more preferably 20% by mass or lower, with respect to the total mass of the water-insoluble polymer. Above all, the content ratio of aromatic rings is preferably in a range of from 15% by mass to 20% by mass, and more preferably in a range of from 17% by mass to 20% by mass. When the content ratio of aromatic rings is within the above range, rub resistance is improved.

Specific examples of the polymer are listed below. However, the present invention is not limited to the following specific examples.

Phenoxyethyl acrylate/methyl methacrylate/acrylic acid copolymer (50/45/5 [mass ratio])

Phenoxyethyl acrylate/benzyl methacrylate/isobutyl methacrylate/methacrylic acid copolymer (30/35/29/6 [mass ratio])

Phenoxyethyl methacrylate/isobutyl methacrylate/methacrylic acid copolymer (50/44/6 [mass ratio])

Phenoxyethyl acrylate/methyl methacrylate/ethyl acrylate/acrylic acid copolymer (30/55/10/5 [mass ratio])

Benzyl methacrylate/methyl methacrylate/methacrylic acid copolymer (60/30/10 [mass ratio])

The acid value of the water-insoluble polymer in the invention is preferably from 30 mgKOH/g to 100 mgKOH/g, more preferably from 30 mgKOH/g to 85 mgKOH/g, and particularly preferably from 50 mgKOH/g to 85 mgKOH/g, from the viewpoints of pigment dispersibility and storage stability.

The "acid value" is defined as the mass (mg) of KOH necessary for completely neutralizing 1 g of the water-insoluble polymer, and is a value measured by the method described in JIS Standards (JIS K 0070, 1992).

The molecular weight of the water-insoluble polymer in the invention, in terms of weight average molecular weight (Mw), is preferably 30,000 or more, more preferably from 30,000 to 150,000, still more preferably from 30,000 to 100,000, and particularly preferably from 30,000 to 80,000.

The water-insoluble polymer can be synthesized by any polymerization method, for example, solution polymerization, precipitation polymerization, suspension polymerization, precipitation polymerization, bulk polymerization, or emulsion polymerization. The polymerization reaction may be carried out using a known procedure such as in a batch manner, a semi-continuous manner, or a continuous manner. The method of initiation of polymerization may be, for example, a method using a radical initiator, a method of irradiating light or a radiation, or the like. These methods of polymerization and methods of initiation of polymerization are described in, for example, Teiji Tsuruta, "Kobunshi Gosei Hoho (Polymer Synthesis Method)", revised edition (published by Nikkan Kogyo Shimbun, Ltd., 1971) and "Kobunshi Gosei no Jikkenho (Experimental Technique of Polymer Synthesis)", written by Takayuki Ohtu and Masaetu Kinoshita, published by Kagaku-Dojin Publishing Company Inc., 1972, pages 124 to 154.

The content of the pigment in the ink composition is preferably in a range of from 0.1% by mass to 15% by mass, and more preferably in a range of from 1% by mass to 10% by mass, with respect to the total mass of the ink composition.

(Polymer Particle)

The ink composition in the invention contains at least one type of polymer particles. By including particles of a polymer that is water-insoluble or substantially water-insoluble, in addition to the above-described resin that coats the pigment, the fixability of the ink composition to the recording medium and the rub resistance of the formed image are further improved. Meanwhile, adhesion and accumulation of ink onto the ink ejection head may tend to occur easily; however, since the ink set of the invention is configured to include the maintenance liquid described above, the occurrence of ejection problem such as ink ejection deviation or non-ejection can be suppressed over a long period of time, and a favorable image forming property can be maintained.

Here, that the polymer is "water-insoluble or substantially water-insoluble" refers to that the dissolution amount is 15 g or less, when the resin is dried at 105° C. for 2 hours and then dissolved in 100 g of water at 25° C. From the viewpoint of improving the continuous ejection property and ejection stability of the ink, the dissolution amount is preferably 10 g or less, more preferably 5 g or less, and particularly preferably 1 g or less. The dissolution amount above is a dissolution amount when the polymer has been 100% neutralized with sodium hydroxide or acetic acid, depending on the type of the salt-forming groups of the water-insoluble polymer.

Examples of the water-insoluble polymer particles include particles of a resin, for example, a thermoplastic, thermosetting, or modified acrylic-based, epoxy-based, polyurethane-based, polyether-based, polyamide-based, unsaturated polyester-based, phenol-based, silicone-based, or fluorine-containing resin; a polyvinyl-based resin such as vinyl chloride, vinyl acetate, polyvinyl alcohol, or polyvinyl butyral; a polyester-based resin such as an alkyd resin or a phthalic acid resin; an amino-based material such as a melamine resin, a melamine-formaldehyde resin, an aminoalkyd co-condensate resin, a urea resin, or a urea resin; or any copolymer or mixture thereof. Among the above resins, an anionic acrylic-based resin may be obtained, for example, by polymerizing, in a solvent, an acrylic monomer having an anionic group (anionic group-containing acrylic monomer) and, if necessary, another monomer that can be copolymerized with the anionic group-containing acrylic monomer. Examples of the anionic group-containing acrylic monomer include acrylic monomers having one or more groups selected from the group consisting of a carboxyl group, a sulfonic acid group, and a phosphonic acid group. Among them, acrylic monomers having a carboxyl group (for example, acrylic acid, methacrylic acid, crotonic acid, ethacrylic acid, propylacrylic acid, isopropylacrylic acid, itaconic acid, fumaric acid, and the like) are preferable, and acrylic acid and methacrylic acid are particularly preferable.

The water-insoluble polymer particles are preferably self-dispersing polymer particles from the viewpoints of ejection stability and the liquid stability (particularly, dispersion stability) of the system including the pigment. The self-dispersing polymer (hereinafter, referred to as "self-dispersing resin".) refers to a water-insoluble polymer which can get into a dispersed state in an aqueous medium due to the functional groups (particularly, acidic groups or salts thereof) of the polymer itself, when made into a dispersed state by a phase inversion emulsification method in the absence of a surfactant.

The scope of the term "dispersed state" used herein includes both an emulsified state (emulsion) in which a water-insoluble polymer in the liquid state is dispersed in an aqueous medium, and a dispersed state (suspension) in which a water-insoluble polymer in the solid state is dispersed in an aqueous medium.

The self-dispersing resin is preferably a self-dispersing resin that can take a dispersed state in which the water-insoluble polymer is dispersed in the solid state, from the viewpoint of ink fixability when the self-dispersing resin is contained in the ink composition.

An example of the method of preparing an emulsified state or a dispersed state of the self-dispersing resin, i.e., the method of preparing an aqueous dispersion of the self-dispersing resin, is a phase inversion emulsification method. An example of the phase inversion emulsification method is a method including: dissolving or dispersing a self-dispersing resin in a solvent (for example, a water-soluble organic solvent or the like); then directly pouring the obtained liquid into water without adding a surfactant; stirring and mixing the resulting liquid in a state in which the salt-forming groups (for example, acidic groups) possessed by the self-dispersing resin are neutralized; and removing the solvent so as to obtain an aqueous dispersion in the emulsified or dispersed state.

The stably emulsified or dispersed state in the self-dispersing resin refers to a state which can be determined by the following procedure: a solution obtained by dissolving 30 g of a water-insoluble polymer in 70 g of an organic solvent (for example, methyl ethyl ketone), a neutralizing agent that can neutralize the salt-forming groups of the water-insoluble polymer to a degree of neutralization of 100% (sodium hydroxide if the salt-forming groups are anionic, or acetic acid if the salt-forming groups are cationic), and 200 g of water are mixed and stirred (apparatus: a stirring apparatus having a stirring blade, rotation rate: 200 rpm, for 30 minutes, at 25° C.), and then the organic solvent is removed from the mixed liquid. If a stably emulsified or dispersed state is maintained for at least one week at 25° C. even after the removal of the organic solvent from the mixed liquid, and occurrence of precipitation is not confirmed by visual observation, the state of the water-insoluble resin is considered to be a stably emulsified or dispersed state.

Further, the stability of the emulsified or dispersed state of the self-dispersing resin can also be confirmed by an accelerated test of precipitation using centrifugal separation. In the accelerated test of precipitation using centrifugal separation, the stability can be evaluated by, for example, adjusting the aqueous dispersion of the polymer particles obtained by the method described above to have a solid concentration of 25% by mass, then performing centrifugal separation at 12,000 rpm for one hour, and measuring the solid concentration of the supernatant after the centrifugal separation.

When the ratio of the solid concentration after centrifugal separation to the solid concentration before centrifugal separation is large (a numerical value close to 1), it is indicated that precipitation of the polymer particles due to centrifugal separation does not occur; in other words, the aqueous dispersion of the polymer particles is relatively more stable. In the invention, the ratio of the solid concentration after centrifugal separation to the solid concentration before centrifugal separation is preferably 0.8 or higher, more preferably 0.9 or higher, and particularly preferably 0.95 or higher.

In the self-dispersing resin, the content of the water-soluble components that exhibit water solubility when the self-dispersing resin is made into a dispersed state is preferably 10% by mass or lower, more preferably 8% by mass or lower, and still more preferably 6% by mass or lower. When the content of the water-soluble components is 10% by mass or lower, swelling of the polymer particles or fusion between the polymer particles is effectively suppressed, and a relatively more stable dispersed state can be maintained. In addition, an increase in the viscosity of the ink composition can be suppressed, and ejection stability becomes better, for example, in the case of employing the ink composition in an inkjet method.

The term "water-soluble component" as used herein refers to a compound which is included in the self-dispersing resin, and which dissolves in water in a case in which the self-dispersing resin is made into a dispersed state. The water-soluble component is a water-soluble compound which is generated as a by-product or is incorporated during the production of the self-dispersing resin.

The main chain skeleton of the water-insoluble resin is not particularly limited, and examples thereof include a vinyl polymer and a condensation polymer (an epoxy resin, polyester, polyurethane, polyamide, cellulose, polyether, polyurea, polyimide, polycarbonate, or the like). Among them, a vinyl polymer is particularly preferable.

Preferable examples of the vinyl polymer and monomers used for producing the vinyl polymer may include those described in JP-A Nos. 2001-181549 and 2002-88294. Another example of the vinyl polymer, which can be used, is a vinyl polymer having a dissociative group at the terminal of the polymer chain, the dissociative group having been introduced by radical polymerization of a vinyl monomer using a chain transfer agent, a polymerization initiator, or an iniferter, each of which has a dissociative group (or a substituent that can be derivatized into a dissociative group), or by ion polymerization using a compound having a dissociative group (or a substituent that can be derivatized into a dissociative group) as either an initiator or a terminator.

Preferable examples of the condensation polymer and monomers used for producing the condensation polymer may include those described in JP-A No. 2001-247787.

From the viewpoint of self-dispersibility, the particles of the self-dispersing resin preferably include a water-insoluble polymer that contains a hydrophilic structural unit and a structural unit derived from an aromatic group-containing monomer or a cyclic aliphatic group-containing monomer.

The above "hydrophilic structural unit" is not particularly limited as long as the hydrophilic structural unit is derived from a hydrophilic group-containing monomer, and may be a structural unit derived from one type of hydrophilic group-containing monomer or a structural unit derived from two or more types of hydrophilic group-containing monomers. The hydrophilic group is not particularly limited, and may be a dissociative group or a nonionic hydrophilic group. The hydrophilic group is preferably a dissociative group, and more preferably an anionic dissociative group, from the viewpoint of promoting self-dispersion and from the viewpoint of the stability of the formed emulsified or dispersed state. Examples of the dissociative group include a carboxyl group, a phosphoric acid group, and a sulfonic acid group. Among them, a carboxyl group is preferable from the viewpoint of fixability of the ink composition obtained.

The hydrophilic group-containing monomer is preferably a dissociative group-containing monomer, and more preferably a dissociative group-containing monomer having a dissociative group and an ethylenically unsaturated bond, from the viewpoints of self-dispersibility and aggregating properties. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxyethyl succinic acid. Specific examples of the unsaturated sulfonic acid monomer and the unsaturated phosphoric acid monomer are described in paragraphs [0063] to of JP-A No. 2001-162692.

Among the dissociative group-containing monomers, unsaturated carboxylic acid monomers are preferable, acrylic monomers are more preferable, and acrylic acid and methacrylic acid are particularly preferable, from the viewpoints of dispersion stability and ejection stability.

The particles of the self-dispersing resin preferably include a polymer having a carboxyl group, and more preferably include a polymer which has a carboxyl group and has an acid value of from 25 mgKOH/g to 100 mgKOH/g, from the viewpoints of self-dispersibility and the coagulation speed when contacting with the treatment liquid during image formation using a treatment liquid. Further, from the viewpoint of self-dispersibility, the acid value is more preferably from 30 mgKOH/g to 90 mgKOH/g, and particularly preferably from 35 mgKOH/g to 65 mgKOH/g. Specifically, when the acid value is 25 mgKOH/g or higher, the stability of self-dispersibility is improved, and when the acid value is 100 mgKOH/g or lower, aggregating properties are improved.

The aromatic group-containing monomer is not particularly limited as long as the monomer is a compound containing an aromatic group and a polymerizable group. The aromatic group may be a group derived from an aromatic hydrocarbon or a group derived from an aromatic heterocycle. In the invention, the aromatic group is preferably an aromatic group derived from an aromatic hydrocarbon, from the viewpoint of particle shape stability in an aqueous medium.

Further, the polymerizable group may be a condensation-polymerizable group or an addition-polymerizable group. In the invention, the polymerizable group is preferably an addition-polymerizable group, and more preferably a group containing an ethylenically unsaturated bond, from the viewpoint of particle shape stability in an aqueous medium.

The aromatic group-containing monomer is preferably a monomer having an aromatic group derived from an aromatic hydrocarbon and an ethylenically unsaturated bond. The aromatic group-containing monomers may be used singly, or in combination of two or more kinds thereof. Examples of the aromatic group-containing monomer include phenoxyethyl (meth)acrylate, benzyl(meth)acrylate, phenyl(meth)acrylate, and styrenic monomers. Above all, aromatic group-containing (meth)acrylate monomers are preferable, at least one selected from the group consisting of phenoxyethyl(meth) acrylate, benzyl(meth)acrylate, and phenyl(meth)acrylate is more preferable, and phenoxyethyl(meth)acrylate and benzyl (meth)acrylate are still more preferable, from the viewpoints of the balance of hydrophilicity and hydrophobicity of the polymer chain and ink fixability.

The term "(meth)acrylate" means acrylate or methacrylate.

The cyclic aliphatic group-containing monomer is preferably a monomer having a cyclic aliphatic group derived from a cyclic aliphatic hydrocarbon and an ethylenically unsaturated bond, and more preferably a cyclic aliphatic group-containing (meth)acrylate monomer (hereinafter, may be referred to as "alicyclic (meth)acrylate").

The "alicyclic (meth)acrylate" refers to a compound which contains a structural moiety derived from (meth)acrylic acid and a structural moiety derived from an alcohol, in which the structural moiety derived from an alcohol has a structure containing at least one substituted or unsubstituted alicyclic hydrocarbon group (cyclic aliphatic group). Note that, the alicyclic hydrocarbon group may be a structural moiety derived from an alcohol itself, or may bond to a structural moiety derived from an alcohol through a linking group.

The alicyclic hydrocarbon group is not particularly limited as long as the group contains a cyclic non-aromatic hydrocarbon group, and examples thereof include a monocyclic hydrocarbon group, a bicyclic hydrocarbon group, and a polycyclic hydrocarbon group that is tricyclic or higher-cyclic. Examples of the alicyclic hydrocarbon group may include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.$0^{2,6}$]decanyl group, and bicyclo[4.3.0]nonane. The alicyclic hydrocarbon group may further have a substituent. The alicyclic hydrocarbon group may further form a condensed ring. From the viewpoints of the viscosity and solubility, it is preferable that the alicyclic hydrocarbon group moiety of the alicyclic hydrocarbon group in the invention has from 5 to 20 carbon atoms.

Specific examples of the alicyclic (meth)acrylate include the compounds shown below; however, the invention is not limited to these specific examples.

Examples of monocyclic (meth)acrylates include cycloalkyl(meth)acrylates containing a cycloalkyl group having from 3 to 10 carbon atoms, such as cyclopropyl(meth) acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate, and cyclodecyl(meth)acrylate. Examples of bicyclic (meth)acrylates include isobornyl(meth)acrylate and norbornyl(meth) acrylate. Examples of tricyclic (meth)acrylates include adamantyl(meth)acrylate, dicyclopentanyl(meth)acrylate, and dicyclopentenyloxy ethyl(meth)acrylate. These alicyclic (meth)acrylates may be used singly, or in mixture of two or more kinds thereof.

Above all, the alicyclic (meth)acrylate is preferably a bicyclic (meth)acrylate or a tiricyclic or higher cyclic (meth) acrylate, and more preferably at least one selected from the group consisting of isobornyl(meth)acrylate, adamantyl (meth)acrylate, and dicyclopentanyl(meth)acrylate, from the viewpoints of the dispersion stability of the self-dispersing polymer particles, fixability, and blocking resistance.

The self-dispersing resin is preferably an acrylic resin including a structural unit derived from a (meth)acrylate monomer, and preferably an acrylic resin including a structural unit derived from an aromatic group-containing (meth) acrylate monomer or an alicyclic (meth)acrylate. Further, the self-dispersing resin preferably includes a structural unit derived from an aromatic group-containing (meth)acrylate monomer or alicyclic (meth)acrylate, at a content of from 10% by mass to 95% by mass. When the content of an aromatic group-containing (meth)acrylate monomer or alicyclic (meth)acrylate is from 10% by mass to 95% by mass, the stability of the self-emulsified or self-dispersed state is improved, and further, an increase in the ink viscosity can be suppressed.

From the viewpoints of the stability of the self-dispersed state, stabilization of the particle shape in an aqueous medium due to hydrophobic interaction between aromatic rings, and a decrease in the amount of water-soluble components through hydrophobization of the particles to an appropriate degree, the content of the structural unit derived from an aromatic group-containing (meth)acrylate monomer or alicyclic (meth)acrylate is more preferably from 15% by mass to 90% by mass, still more preferably from 15% by mass to 80% by mass, and particularly preferably from 25% by mass to 70% by mass.

The self-dispersing resin may include, for example, a structural unit derived from an aromatic group-containing monomer or a cyclic aliphatic group-containing monomer (preferably, alicyclic (meth)acrylate), and a structural unit derived from a dissociative group-containing monomer. The self-dispersing resin may further include one or more additional structural units, if necessary.

The monomer that forms the additional structural unit is not particularly limited as long as the monomer is copolymerizable with the aromatic group-containing monomer and the dissociative group-containing monomer. Above all, from the viewpoints of the flexibility of the polymer skeleton and the ease of control of the glass transition temperature (Tg), the monomer that forms the additional structural unit is preferably an alkyl group-containing monomer (for example, alkyl (meth)acrylate such as methyl(meth)acrylate, ethyl(meth) acrylate, isopropyl(meth)acrylate, n-propyl(meth)acrylate, n-butyl(meth)acrylate, isobutyl(meth)acrylate, t-butyl(meth) acrylate, hexyl(meth)acrylate, or ethylhexyl(meth)acrylate).

The molecular weight of the water-insoluble polymer that forms the self-dispersing resin particles, in terms of weight average molecular weight, is preferably from 3,000 to 200, 000, more preferably from 5,000 to 150,000, and still more preferably from 10,000 to 100,000. When the weight average molecular weight is 3,000 or more, the amount of water-soluble components can be effectively suppressed. Further, when the weight average molecular weight is 200,000 or less, the self-dispersion stability can be enhanced.

Note that, the weight average molecular weight is measured by gel permeation chromatography (GPC). Details of GPC are as described above.

The water-insoluble polymer that forms the self-dispersing resin particles preferably includes a structural unit derived from an aromatic group-containing (meth)acrylate monomer or a cyclic aliphatic group-containing monomer (preferably, alicyclic (meth)acrylate) at a copolymerization ratio of from 15% by mass to 80% by mass relative to the total mass of the self-dispersing polymer particles, from the viewpoint of the control of hydrophilicity and hydrophobicity of the polymer.

From the viewpoint of the control of hydrophilicity and hydrophobicity of the polymer, it is preferable that the water-insoluble polymer includes a structural unit derived from an aromatic group-containing (meth)acrylate monomer (preferably, a structural unit derived from phenoxyethyl(meth)acrylate and/or a structural unit derived from benzyl(meth)acrylate) or a structural unit derived from alicyclic (meth)acrylate (preferably, a structural unit derived from isobornyl(meth) acrylate and/or a structural unit derived from adamantyl (meth)acrylate and/or a structural unit derived from dicyclopentanyl(meth)acrylate)) at a copolymerization ratio of from 15% by mass to 80% by mass, a structural unit derived from a carboxyl group-containing monomer, and a structural unit derived from an alkyl group-containing monomer (preferably, a structural unit derived from an alkyl (having from 1 to 4 carbon atoms) ester of (meth)acrylic acid).

Specific examples of the water-insoluble resin that forms the polymer particles include a phenoxyethyl acrylate/methyl methacrylate/acrylic acid copolymer (50/45/5), a phenoxyethyl acrylate/benzyl methacrylate/isobutyl methacrylate/methacrylic acid copolymer (30/35/29/6), a phenoxyethyl methacrylate/isobutyl methacrylate/methacrylic acid copolymer (50/44/6), a phenoxyethyl acrylate/methyl methacrylate/ethyl acrylate/acrylic acid copolymer (30/55/10/5), a benzyl methacrylate/isobutyl methacrylate/methacrylic acid copolymer (35/59/6), a styrene/phenoxyethyl acrylate/methyl methacrylate/acrylic acid copolymer (10/50/35/5), a benzyl acrylate/methyl methacrylate/acrylic acid copolymer (55/40/5), a phenoxyethyl methacrylate/benzyl acrylate/methacrylic acid copolymer (45/47/8), a styrene/phenoxyethyl acrylate/butyl methacrylate/acrylic acid copolymer (5/48/40/7), a benzyl methacrylate/isobutyl methacrylate/cyclohexyl methacrylate/methacrylic acid copolymer (35/30/30/5), a phenoxyethyl acrylate/methyl methacrylate/butyl acrylate/methacrylic acid copolymer (12/50/30/8), a benzyl acrylate/isobutyl methacrylate/acrylic acid copolymer (93/2/5), a methyl methacrylate/methoxyethyl acrylate/benzyl methacrylate/acrylic acid copolymer (44/15/35/6), a styrene/butyl acrylate/acrylic acid copolymer (62/35/3), a methyl methacrylate/phenoxyethyl acrylate/acrylic acid copolymer (45/51/4), a methyl methacrylate/isobornyl methacrylate/methacrylic acid copolymer (20/72/8), a methyl methacrylate/isobornyl methacrylate/methacrylic acid copolymer (40/52/8), a methyl methacrylate/isobornyl methacrylate/methacrylic acid copolymer (48/42/10), a methyl methacrylate/isobornyl methacrylate/dicyclopentanyl methacrylate/methacrylic acid copolymer (20/62/10/8), and a methyl methacrylate/dicyclopentanyl methacrylate/methacrylic acid copolymer (20/72/8). Note that, the mass ratios of the copolymerization components are shown in the parentheses.

It is preferable that the water-insoluble resin that forms the polymer particles includes a polymer that has been synthesized in an organic solvent, the polymer has an anionic group (for example, a carboxyl group), some or all of the anionic groups (for example, carboxyl groups) of the polymer are neutralized, and the polymer is prepared in the form of a polymer dispersion (dispersion) in which the continuous phase is water. In other words, production of the water-insoluble polymer particles is preferably carried out by a method which includes a process of synthesizing a polymer in an organic solvent, and a dispersion process of forming an aqueous dispersion in which some or all of the anionic groups (for example, carboxyl groups) of the polymer are neutralized. The dispersion process preferably includes the following process (1) and process (2).

Process (1): a process of stirring a mixture containing a polymer (water-insoluble polymer), an organic solvent, a neutralizing agent, and an aqueous medium Process (2): a process of removing the organic solvent from the mixture The process (1) is preferably a process including dissolving a polymer (water-insoluble polymer) in an organic solvent, first, and then gradually adding a neutralizing agent and an aqueous medium thereto, followed by mixing and stirring to obtain a dispersion. When a neutralizing agent and an aqueous medium are added to the water-insoluble polymer solution prepared by dissolving a water-insoluble polymer in an organic solvent as described above, self-dispersing polymer particles which have a diameter of higher storage stability can be obtained without requiring a strong shearing force. The method of stirring the mixture is not particularly limited, and a generally-used mixing stirrer or, if necessary, a disperser such as an ultrasonic disperser or a high-pressure homogenizer may be used. In the process (2), the organic solvent is evaporated from the dispersion obtained through the process (1) by a common method such as distillation under reduced pressure, to convert the phase into an aqueous system, whereby an aqueous dispersion of self-dispersing polymer particles can be obtained. The obtained aqueous dispersion is substantially free from the organic solvent, and the amount of the organic solvent is preferably 0.2% by mass or less, and more preferably 0.1% by mass or less.

Preferable examples of the organic solvent include alcohol solvents, ketone solvents, and ether solvents. As the organic solvent, an organic solvent exemplified in paragraph 0059 of JP-A No. 2010-188661 can be used.

As the neutralizing agent, a neutralizing agent exemplified in paragraphs 0060 to 0061 of JP-A No. 2010-188661 can be used.

The average particle diameter of the self-dispersing resin particles in terms of volume average particle diameter is preferably in a range of from 10 nm to 400 nm. There is no particular limitation concerning the particle diameter distribution of the self-dispersing resin particles, and the particles may exhibit a wide particle diameter distribution or may exhibit a monodispersed particle diameter distribution. Two or more types of water-insoluble particles may be used by mixing them.

The content of the polymer particles in the ink composition is preferably from 0.5% by mass to 10% by mass, and more preferably from 1% by mass to 9% by mass, with respect to the total amount (on the basis of mass) of the ink composition. When the content of the polymer particles is 0.5% by mass or higher, rub resistance of the image is improved. When the content of the resin particles is 10% by mass or lower, it is advantageous in terms of long-term ejection stability of the ink composition obtained.

(Water)

The ink composition in the invention may be configured to include water. The amount of water is not particularly limited, and is preferably in a range of from 10% by mass to 99% by mass, from the viewpoint of ensuring stability and discharge reliability.

(Urea or Derivative Thereof)

It is preferable that the ink composition according to the invention contains urea or a derivative thereof. When urea or a derivative thereof is contained, cleaning properties by wiping or the like in a case in which an ink composition including a pigment has adhered are improved. Particularly, in a case in which the ink composition contains the polymer particles described above, the wiping properties when the ink composition is dried and solidified are improved.

Examples of the urea derivative include a compound obtained by substituting the hydrogen on the nitrogen of urea with an alkyl group or alkanol, thiourea, and a compound obtained by substituting the hydrogen on the nitrogen of thiourea with an alkyl group or alkanol. Specific examples include N,N-dimethylurea, thiourea, ethylene urea, hydroxyethyl urea, hydroxybutyl urea, ethylene thiourea, and diethyl thiourea.

The content of the urea or derivative thereof in the ink composition is preferably from 1.0% by mass to 20.0% by mass, and more preferably from 2.0% by mass to 15.0% by mass, with respect to the total mass of the ink composition.

When the content of the urea or derivative thereof is 1.0% by mass or higher, it becomes easier to wipe out the adhered ink in a case in which an ink has adhered, and maintenance properties are improved. When the content of the urea or derivative thereof is 20.0% by mass or lower, it is advantageous in terms of prevention of stickiness due to the moisture absorption of the urea or derivative thereof contained in the image and prevention of blocking (Other Components)

Other than the above components, the ink composition in the invention can further contain additional components, if necessary. Examples of the additional components include known additives such as a surfactant, an ultraviolet absorbent, an anti-fading agent, a mildew proofing agent, a pH adjusting agent, an antirust agent, an antioxidant, an emulsion stabilizer, an antiseptic, an antifoaming agent, a viscosity adjusting agent, a dispersion stabilizer, or a chelating agent.

The pH of the ink composition in the invention is not particularly limited, but from the viewpoints of preventing aggregation of coloring materials included in the ink composition and enhancing the cleaning performance, the pH at 25° C. is preferably in a range of from 6.5 to 12, and more preferably in a range of from 7 to 10. In order to adjust the pH of the ink composition to be within the above range, a pH adjusting agent such as the above-described water-soluble basic substance or the like can be used, if necessary.

The ink set of the invention is configured to include an ink composition containing a pigment and the above-described maintenance liquid of the invention. The configuration of the maintenance liquid has the same definition as that of the above-described maintenance liquid of the invention, and preferable examples are also the same.

The maintenance liquid and ink set for inkjet recording of the invention are used for inkjet recording, and specifically, the maintenance liquid and ink set for inkjet recording of the invention are used in the case of recording images on a known image receiving material (for example, plain paper, resin-coated paper, paper exclusively used for inkjet recording, a film, electrophotographic common paper, fabrics, glass, metal, ceramics, or the like), by supplying energy to the ink for inkjet recording.

<Image Forming Method>

The image forming method of the invention uses the above-described ink set for inkjet recording of the invention, and includes an ink application process of applying an ink composition onto a recording medium by ejecting the ink composition from an inkjet recording head, and an ink removal process of removing the ink composition that has adhered to the inkjet recording head using a maintenance liquid for inkjet recording. The image forming method of the invention may further include a treatment liquid application process of applying a treatment liquid containing an aggregating component that causes aggregation of components in the ink composition, onto the recording medium.

In the image forming method of the invention, by using the maintenance liquid for inkjet recording of the invention, as described above, the solubility of ink that easily adheres to the surface of the ink ejection head, because of containing a pigment and polymer particles, and is hardly dissolved or removed after drying, especially, ink-derived solids that have been solidified due to drying, is excellent. Accordingly, a stable image forming property is retained over a long period of time. Thereby, in the process of wiping or the like after washing, for example, a phenomenon in which the ejection hole is blocked or sediment is generated in the vicinity of the ejection hole by ink-derived solids such as a substance of dried and solidified mistral granule ink is prevented.

—Ink Application Process—

In the ink application process in the invention, the ink composition is ejected from an inkjet recording head, thereby applying the ink composition onto a recording medium, to form an image on the recording medium. In the process, the ink composition can be applied onto a recording medium, and thus, a desired visible image can be formed. The details of the ink composition are as described above.

The inkjet method is not particularly limited, and may be a known method. Examples thereof include a charge control system in which an ink is ejected by utilizing an electrostatic attraction force; a drop-on-demand system (pressure pulse system) in which a vibration pressure of a piezo element is utilized; an acoustic inkjet system in which an electric signal is converted into an acoustic beam and an ink is irradiated with the acoustic beam so that the ink is ejected by utilizing the radiation pressure; and a thermal inkjet (BUBBLE JET (registered trademark)) system in which an ink is heated to form bubbles and the resulting pressure is utilized. As the inkjet method, particularly, the inkjet method described in JP-A No. S54-59936, in which thermal energy is applied to an ink, the ink volume changes drastically, and by using the force caused by this change, the ink is ejected from the nozzle, can be effectively utilized.

It should be noted that the above inkjet method include, in its scope, a system of discharging a large number of small-volume ink having low concentration, which is referred to as a photo-ink; a system of improving the image quality by using plural inks which have substantially the same hue but different concentrations; and a system of using colorless and transparent ink.

The inkjet head used in the inkjet method may be either an on-demand system or a continuous system. Specific examples of the ejection system may include an electric-mechanical conversion system (for example, single cavity type, double cavity type, bender type, piston type, share mode type, shared wall type, or the like), an electric-thermal conversion system (for example, thermal inkjet type, BUBBLE JET (registered trademark) type, or the like), an electrostatic attraction system (for example, electric field control type, slit jet type, or the like), and an electric discharge system (for example, spark jet type or the like), and any of the ejection systems may be used. Ink nozzles and the like, which are used for recording by the inkjet method, are not particularly limited and may be selected as appropriate according to the purposes.

Examples of the inkjet head include a shuttle system in which a short serial head is used and recording is performed while allowing the head to scan in the width direction of the recording medium, and a line system using a line head in which recording elements are arranged corresponding to the whole region for one side of a recording medium. In the line system, an image can be recorded over the whole surface of the recording medium by allowing the recording medium to scan in the direction being at right angles to the arranging direction of the recording elements, in which a transportation system such as a carriage by which the short head moves for scanning is not necessary. Further, in the line system, since complicated scanning control for the movement of the carriage and the recording medium is not necessary and only the recording medium moves, a higher recording speed can be realized as compared with the shuttle system.

The image forming method of the invention is applicable to any one of these systems; however, in a case in which the image forming method of the invention is applied to the line system in which dummy jetting is not generally carried out, the effects of improvements in the ejection accuracy and the rub resistance of the image are remarkable.

In the ink application process, the liquid droplet volume of the ink droplet applied (spotted) is preferably from 1.5 pL to 3.0 pL, and more preferably from 1.5 pL to 2.5 pL, from the viewpoint of obtaining a high resolution image.

The liquid droplet volume of the ink droplet can be adjusted by appropriately selecting the ejection conditions in the inkjet method, according to the ink composition to be spotted.

—Ink Removal Process—

In the ink removing process in the invention, the ink composition (for example, ink-derived solids that have been solidified due to drying) that has adhered to the inkjet recording head, through ejecting the ink composition in the above ink application process, is removed using the maintenance liquid for inkjet recording. The details of the constitution of the maintenance liquid used in the process, preferable embodiments, and the like are as described above.

In the ink removal process, in order to remove the ink composition from the nozzle face of the head, the maintenance liquid is applied to the head (for example, the vicinity of the head, ink flow channels, and the like; hereinafter, may also be referred to as "head and the like"). When the maintenance liquid is applied to the head and the like, the ink composition may dissolve or swell.

Application of the maintenance liquid can be performed by, for example, ejection in accordance with an inkjet method, coating using a roller, spraying, or the like. However, as described in JP-A No. 2011-73295 or JP-A No. 2011-73339, a method is preferable, in which a column of a maintenance liquid is formed on a maintenance liquid (cleaning liquid) coating unit by utilizing a water head difference, and when an inkjet recording head passes across the maintenance liquid column, a liquid film is formed between the head and the maintenance liquid coating unit, whereby the maintenance liquid is applied to the head.

Further, before or after the application of the maintenance liquid, it is preferable to remove the ink composition by scraping off using a blade or wiping off using cloth or a paper. Examples of a preferable method include a method of rubbing (wiping) the nozzle face using a wiper blade after applying the maintenance liquid, thereby scraping off the ink composition, a method of removing the ink composition using wind pressure or liquid pressure of the maintenance liquid or the like, and a method of wiping off the ink composition using cloth or a paper. Among them, a method of wiping off the ink composition using cloth or a paper is particularly preferable. As a method of wiping off by always using a new cloth, for example, JP-A No. 2010-241127 discloses a method for reducing the frequency of changing the wiping members and reducing the size of the apparatus.

Further, in the method of wiping off the ink composition using cloth or a paper, it is possible to directly apply the maintenance liquid to cloth or a paper, and wiping the head surface with the wet cloth or paper. This method is also preferably used, since the amount of the maintenance liquid used can be reduced, as compared with the method of applying the maintenance liquid, by using a coating unit, before wiping.

The material of the wiper blade is preferably a rubber having elasticity. Specific examples of the material include butyl rubber, chloprene rubber, ethylene propylene rubber, silicone rubber, urethane rubber, and nitrile rubber. A wiper blade that is coated with a fluororesin or the like, in order to impart ink repellency to the wiper blade, may also be used.

The amount of the maintenance liquid to be applied is not particularly limited as long as the amount is enough to dissolve or swell the ink composition, but the application amount of the maintenance liquid is preferably from 1 $g/m^2$ to 100 $g/m^2$.

—Treatment Liquid Application Process—

In the treatment liquid application process in the invention, a treatment liquid containing an aggregating component that causes aggregation of the components in the ink composition is applied onto a recording medium. When the ink composition and the aggregating component are mixed on the recording medium, aggregation of pigment and the like, which are stably dispersed in the ink composition, is promoted.

Application of the treatment liquid can be performed by employing a known method such as a coating method, an inkjet method, or a dipping method. The coating method can be carried out by a known coating method using a bar coater, an extrusion die coater, an air doctor coater, a blade coater, a rod coater, a knife coater, a squeeze coater, a reverse roll coater, a bar coater, or the like. The details of the inkjet method are as described above.

The aggregating component is preferably at least one selected from the group consisting of a cationic polymer, an acidic compound, and a polyvalent metal salt, from the viewpoint of image quality.

As the cationic polymer, a polymer having, as the cationic group, a primary to tertiary amino group or a quaternary ammonium salt group is preferably used. The cationic polymer is preferably a homopolymer of a monomer (cationic monomer) having a primary to tertiary amino group or a salt thereof, or a quaternary ammonium salt group, or a polymer obtained as a copolymer or condensation polymer of the cationic monomer and other monomer (non-cationic monomer). These polymers may be used in the form of a water-soluble polymer, or in the form of water-dispersible latex particles. Specifically, the cationic polymer is selected from the group consisting of poly(vinylpyridine) salts, polyalkylamino ethyl acrylate, polyalkylamino ethyl methacrylate, poly(vinyl imidazole), polyethylene imine, polybiguanide, polyguanide, copolymers including an epihalohydrin derivative and an amino derivative, and any combination thereof.

The treatment liquid may include an aqueous solvent (for example, water) in addition to the cationic polymer.

The content of the cationic polymer in the treatment liquid is preferably from 5% by mass to 95% by mass, and more preferably from 10% by mass to 80% by mass, with respect to the total amount of the treatment liquid, in view of the coagulation effect.

Examples of the acidic compound includes compounds capable of changing the pH of the ink composition. Examples of the acidic compound include a compound having a phosphoric acid group, a phosphonic acid group, a phosphinic acid group, a sulfuric acid group, a sulfonic acid group, a sulfinic acid group, or a carboxyl group, and a salt thereof (for example, a polyvalent metal salt). Among them, from the viewpoint of the coagulation speed of the ink composition, a compound having a phosphoric acid group or a carboxyl group is preferable, and a compound having a carboxyl group is more preferable. Examples of the compound having a carboxyl group include polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, derivatives of these compounds, and salts thereof (for example, polyvalent metal salts).

In the case of using the acidic compound, the pH (at 25° C.) of the treatment liquid is preferably in a range of from 0.5 to 3, more preferably in a range of from 0.6 to 2, and still more preferably in a range of from 0.7 to 1.5, from the viewpoints of the coagulation speed of the ink composition. In this case, the pH (at 25° C.) of the ink composition is preferably 7.5 or higher, and more preferably 8 or higher. Above all, the case in which the pH (at 25° C.) of the ink composition is 7.5 or higher and the pH (at 25° C.) of the treatment liquid is within a range of from 0.7 to 1.5 is preferable, from the viewpoints of image density, resolution, and increasing the speed of recording.

The content of the acidic compound in the treatment liquid is preferably from 5% by mass to 95% by mass, and more preferably from 10% by mass to 80% by mass, with respect to the total amount of the treatment liquid, from the viewpoint of the coagulation effect.

Examples of the polyvalent metal salt may include salts of an alkaline earth metal belonging to Group 2 of the periodic table (for example, magnesium or calcium), salts of a transition metal belonging to Group 3 of the periodic table (for example, lanthanum), salts of a cation of an element belonging to Group 13 of the periodic table (for example, aluminum), and salts of a lanthanide (for example, neodium). As the metal salts, carboxylic acid salts (formic acid salts, acetic acid salts, benzoic acid salts, or the like), nitric acid salts, chlorides, and thiocyanic acid salts are preferable. Among them, a calcium salt or magnesium salt of carboxylic acid (a salt of formic acid, acetic acid, benzoic acid, or the like), a calcium salt or magnesium salt of nitric acid, calcium chloride, magnesium chloride, and a calcium salt or magnesium salt of thiocyanic acid are preferable.

The content of the polyvalent metal salt in the treatment liquid is preferably from 1% by mass to 10% by mass, more preferably from 1.5% by mass to 7% by mass, and still more preferably from 2% by mass to 6% by mass.

The viscosity of the treatment liquid is preferably from 1 mPa·s to 30 mPa·s, more preferably from 1 mPa·s to 20 mPa·s, still more preferably from 2 mPa·s to 15 mPa·s, and particularly preferably from 2 mPa·s to 10 mPa·s, from the viewpoint of the coagulation speed of the ink composition. The viscosity is a value measured at 20° C. using a VISCOMETER TV-22 (manufactured by TOKI SANGYO CO., LTD.). Further, the surface tension of the treatment liquid is preferably from 20 mN/m to 60 mN/m, more preferably from 20 mN/m to 45 mN/m, and still more preferably from 25 mN/m to 40 mN/m, from the viewpoint of the coagulation speed of the ink composition. The surface tension is a value measured at 25° C. using an AUTOMATIC SURFACE TENSIOMETER CBVP-Z (manufactured by Kyowa Interface Science Co. Ltd.).

The treatment liquid application process may be provided before or after the ink application process using the ink composition. An embodiment in which the treatment liquid application process is provided before the ink application process is preferable. Before applying (spotting) the ink composition onto the recording medium, the treatment liquid for aggregating the components (resin particles or the like) in the ink composition is applied onto the recording medium in advance, and the ink composition is spotted so as to be in contact with the treatment liquid that has been applied onto the recording medium, to form an image. Thereby, inkjet recording speed can be increased, and even when high speed recording is performed, an image having high density and high resolution can be obtained.

It is preferable to heat and dry the treatment liquid on the recording medium during a period from after the application of the treatment liquid onto the recording medium to the application of the ink composition. Thereby, favorable ink coloring properties including prevention of bleeding may be improved, and recording of a visible image having favorable color density and favorable hue may be realized.

Heating and drying can be carried out by a known heating means such as a heater, an air blow means utilizing air which is blown from a dryer or the like, or a means combining these.

Examples of a heating method include a method of applying heat, by using a heater or the like, from the opposite side of the recording medium from the surface applied with the treatment liquid, a method of blowing a warm air or hot air to the surface of the recording medium applied with the treatment liquid, and a method of heating using an infrared heater. Heating may also be performed by using two or more of these methods in combination.

<Maintenance Method>

The maintenance method of the invention includes applying the above-described maintenance liquid for inkjet recording of the invention to the ink ejection head for inkjet recording, to which the ink composition has adhered, to remove the ink composition on the ink ejection head for inkjet recording. The details of the constitution of the maintenance liquid, preferable embodiments, and the like are as described above.

As described above, the maintenance liquid for inkjet recording of the invention has high solubility with respect to ink-derived solids. Thus, by applying the maintenance liquid to the ink ejection head for inkjet recording, dissolution and removal is easily conducted, and by the succeeding operation such as wiping or the like, adverse effects such as blocking of the ejection hole or promotion of deposition in the vicinity of the ejection hole are less likely to occur.

In the removal of the ink composition, in order to remove the ink composition that has adhered on the nozzle face of the head, the maintenance liquid is applied to the head (for example, the vicinity of the head, ink flow channels, and the like (head and the like)). When the maintenance liquid is applied to the head and the like, the ink composition may dissolve or swell.

Application of the maintenance liquid may be performed by, for example, ejection in accordance with an inkjet method, coating using a roller, spraying, or the like. As a specific example, the method described in JP-A No. 2011-73295 or JP-A No. 2011-73339 may be used. In this method, a column of a maintenance liquid is formed on a maintenance liquid (cleaning liquid) coating unit by utilizing a water head difference, and when an inkjet recording head passes across the maintenance liquid column, a liquid film is formed between the head and the maintenance liquid coating unit, whereby the maintenance liquid is applied to the head.

The maintenance method can be carried out according to the same operation as that in the ink removal process in the above-described image forming method of the invention.

EXAMPLES

Hereinafter, the present invention is further described in detail with reference to Examples, but it should be construed that the invention is by no means limited to the following Examples as long as not departing from the scope of the invention. Unless otherwise specifically stated, the "part" is based on mass.

The weight average molecular weight was measured by gel permeation chromatography (GPC). For the GPC, an obtained polymer was isolated by removing solvent therefrom, and the obtained solids were diluted with tetrahydrofuran to 0.1% by mass, and measurement was conducted using an HLC-8020GPC (manufactured by Tosoh Corporation), and three pieces of TSK GEL SUPER MULTIPORE HZ-H (manufactured by Tosoh Corporation; 4.6 mmID×15 cm) connected in series, as the column. Regarding the conditions, the sample concentration was 0.35% by mass, the flow rate was 0.35 mL/min, the injected sample amount was 10 μL, and the measurement temperature was 40° C. Detection was performed using an RI detector. The calibration curve was prepared from the eight samples of "F-40", "F-20", "F-4", "F-1", "A-5000", "A-2500", "A-1000", and "n-PROPYLBENZENE" of "STANDARD SAMPLE TSK STANDARD, POLYSTYRENE" (all manufactured by Tosoh Corporation).

The acid value of the polymer was determined in accordance with the method described in JIS Standards (JIS K0070: 1992).

Example 1

<Preparation of Black Ink K>

—Synthesis of Water-Insoluble Polymer Dispersant P-1—

Water-insoluble polymer dispersant P-1 was synthesized as shown below.

88 g of methyl ethyl ketone were added to a 1000 mL three-necked flask equipped with a stirrer and a condenser tube, and heated to 72° C. under a nitrogen atmosphere. To this, a solution obtained by dissolving 0.85 g of dimethyl 2,2'-azobis(isobutyrate), 60 g of benzyl methacrylate, 10 g of methacrylic acid, and 30 g of methyl methacrylate in 50 g of methyl ethyl ketone was added dropwise over 3 hours. After the dropwise addition was completed, the mixture was allowed to react for an additional one hour, and then a solution obtained by dissolving 0.42 g of dimethyl 2,2'-azobis(isobutyrate) in 2 g of methyl ethyl ketone was added thereto. The temperature was elevated to 78° C., and the mixture was heated for 4 hours. The resulting reaction liquid was reprecipitated twice with an excess of hexane, and the separated resin was dried. In this way, 96 g of a benzyl methacrylate/methacrylic acid/methyl methacrylate copolymer (=60/10/30 [mass ratio]) as a water-insoluble polymer dispersant P-1 were obtained (see, the following formula).

The composition of the obtained copolymer was confirmed by $^{1}$H-NMR. The weight average molecular weight (Mw) thereof determined as a polystyrene-equivalent molecular weight by GPC was 44,600. Further, the acid value of this copolymer was determined according to the method described in JIS Standards (JISK0070: 1992), and was found to be 65.2 mgKOH/g.

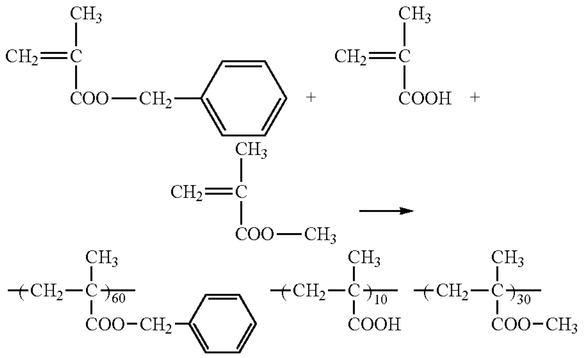

P-1

—Preparation of Pigment Dispersion K—

10 parts of carbon black (NIPEX 160-IQ, manufactured by Degussa), 3 parts of water-insoluble polymer dispersant P-1 obtained as described above, 42 parts of methyl ethyl ketone, 5.5 parts of 1 N NaOH aqueous solution, and 87.2 parts of ion exchanged water were mixed, and the resulting mixture was subjected to dispersion at 2,500 rpm for 6 hours using a bead mill with zirconia beads having a diameter of 0.1 mm. The resulting pigment dispersion was condensed under a reduced pressure at 55° C., until the methyl ethyl ketone was sufficiently removed, and further a portion of water was removed. Then, centrifugation processing (using a 50 mL centrifuge tube) was performed at 8,000 rpm for 30 minutes using a HIGH SPEED REFRIGERATED CENTRIFUGE 7550 (manufactured by Kubota Corp.), to remove the precipitate and recover the supernatant. In this way, a pigment dispersion K of resin-coated pigment particles (pigment coated with a water-insoluble polymer dispersant) was obtained.

An absorbance spectrum of the supernatant was measured and the pigment concentration determined from the absorbance spectrum was 10.2% by mass. The mean particle diameter of the pigment particles dispersed in the pigment dispersion K was 130 nm.

—Preparation of Self-Dispersing Polymer Particles B-01—

560.0 g of methyl ethyl ketone were placed in a 2 L three-necked flask equipped with a mechanical stirrer, a thermometer, a reflux condenser tube, and a nitrogen gas inlet tube, and heated to a temperature of 87° C. While maintaining the contents inside the reaction vessel in a refluxed state (thereafter, refluxing was continued until the reaction was completed), to this reaction vessel, a mixed solution of 278.4 g of methyl methacrylate, 243.6 g of isobornyl methacrylate, 58.0 g of methacrylic acid, 108 g of methyl ethyl ketone, and 2.32 g of "V-601" (manufactured by Wako Pure Chemical Industries, Ltd.) was added dropwise at a constant speed so that the dropwise addition was completed in two hours. After the dropwise addition was completed, the resulting mixture was stirred for one hour. Thereafter, a solution of 1.16 g of "V-601" and 6.4 g of methyl ethyl ketone was added and the resulting mixture was stirred for two hours (process (1)). Subsequently, the process (1) was repeated for four times. Then, a solution of 1.16 g of "V-601" and 6.4 g of methyl ethyl ketone was further added, and stirring was continued for 3 hours. After completion of the polymerization reaction, the temperature of the resulting solution was lowered to 65° C. and then, 163.0 g of isopropanol were added thereto and the resulting mixture was cooled while leaving it standing still. In this way, a solution of a methyl methacrylate/isobornyl methacrylate/methacrylic acid copolymer (=48/42/10 [mass ratio]) was obtained.

The obtained copolymer had a weight average molecular weight (Mw) of 63,000 (calculated as a polystyrene-equivalent molecular weight by GPC), and an acid value of 65.1 mgKOH/g (calculated according to the method described in (JISK0070: 1992)).

Next, the copolymer solution thus obtained was weighed by 317.3 g (solid concentration: 41.0%), to which, then 46.4 g of isopropanol, 1.65 g of a 20% aqueous solution of maleic anhydride (water-soluble acidic compound; which correspond to 0.3% as maleic acid with respect to the amount of the copolymer), and 40.77 g of a 2 mol/L aqueous solution of NaOH were added, and then the temperature inside the reaction vessel was elevated to 70° C. Subsequently, 380 g of distilled water were added dropwise at a rate of 10 mL/min, to achieve dispersion in water (dispersion process).

Thereafter, the temperature inside the reaction vessel was kept at 70° C. under reduced pressure for 1.5 hours to distill off the isopropanol, methyl ethyl ketone, and distilled water in a total distilled amount of 287.0 g (solvent removal process). Then, 0.278 g (which correspond to 440 ppm as benzoisothiazolin-3-one with respect to the amount of the polymer solids) of PROXEL GXL (S) (manufactured by Arch Chemicals Japan, Inc.) were added to the resultant. Then, filtration was conducted using a filter having a pore size of 1 μm, and the filtrate was collected to obtain an aqueous dispersion of self-dispersing polymer particles B-01 having a solids concentration of 26.5%.

The aqueous dispersion of self-dispersing polymer particles B-01 thus obtained was diluted with ion exchanged water to prepare a 25.0% dispersion. The volume average particle diameter was measured according to the following method, and was found to be 3.0 nm.

(Measurement of Volume Average Particle Diameter (Mv))

The aqueous dispersion of self-dispersing polymer particles thus obtained was appropriately diluted to a concentration (the loading index being within the range of from 0.1 to 10) suitable for measurement. Then, the volume average particle diameter was measured by a dynamic light scattering method, using a NANOTRACK particle size distribution analyzer UPA-EX150 (manufactured by Nikkiso Co., Ltd.), with regard to all the aqueous dispersions, under the same measurement conditions. Namely, the measurement was carried out under the following conditions.

Particle permeability: permeation
Particle refractive index: 1.51
Particle shape: non-spherical shape
Density: 1.2 g/$cm^3$
Solvent: water
Cell temperature: from 18° C. to 25° C.

—Preparation of Black Ink—

Using the pigment dispersion K, the water-insoluble polymer dispersant P-1, and the self-dispersing polymer particles B-01, each obtained as described above, the components were mixed so as to achieve the following ink composition. The resulting mixture was placed in a disposable syringe made of plastic, and filtration was conducted using a filter (MILLEX-SV, manufactured by Millipore Corporation; diameter 25 mm) which is made of polyvinylidene fluoride (PVDF) and has a pore size of 1 μm, to obtain black ink (ink composition) K-01.

(Composition of Black Ink)

| | |
|---|---|
| Black pigment (carbon black) | 3.0% by mass |
| Polymer dispersant P-1 described above (solids) | 0.9% by mass |
| Polymer particles B-01 described above (solids) | 7.0% by mass |
| SANNIX GP-250 (manufactured by Sanyo Chemical Industries, Ltd.; water-soluble organic solvent) | 10% by mass |
| Tripropylene glycol monomethyl ether (TPGmME) (MFTG, manufactured by Nippon Nyukazai Co., Ltd.; water-soluble organic solvent) | 3% by mass |
| Dipropylene glycol (manufactured by Wako Pure Chemical Industries, Ltd.; water-soluble organic solvent) | 3% by mass |
| Urea (manufactured by Nissan Chemical Industries, Ltd.; solid wetting agent) | 5% by mass |
| OLFINE E1010 (manufactured by Nissin Chemical Industry Co., Ltd.; surfactant) | 1.5% by mass |
| SELESOL 524 (wax solid content 30%, wax dispersion) (manufactured by Chukyo Yushi Co., Ltd.; carnauba wax particles (volume average particle diameter of 70 nm)) | 2% by mass |
| NEWPOL PE-108 (manufactured by Sanyo Chemical Industries, Ltd.; thickening agent) | 0.2% by mass |
| SNOWTEX XS (manufactured by Nissan Chemical Industries, Ltd.; colloidal silica) | 0.3% by mass |
| Ion exchanged water | Remainder to give 100% by mass in total |

The viscosity was 6.5 mP·s (at 25° C.), and the pH was 8.5 (at 25° C.).

<Preparation of Maintenance Liquid>

The components of the following composition were mixed, thereby preparing a maintenance liquid. The viscosity of the maintenance liquid was 3.1 mP·s (at 25° C.), and the pH was adjusted to 8.5 (at 25° C.), using nitric acid. The viscosity was measured at 25° C. using a VISCOMETER TV-22 (manufactured by TOKI SANGYO CO., LTD.).

(Composition of Maintenance Liquid)

| | |
|---|---|
| DEGmBE (water-soluble organic solvent represented by Formula (II) | 5.0% by mass |
| DEG (moisturizing agent) | 25.0% by mass |
| Imidazole (pKa = 7.0, basic compound) | 0.5% by mass |
| SNOWTEX XS | 0.2% by mass |
| Compound represented by Formula (I), shown in Table 1 below | 3.0% by mass |
| Ion exchanged water | Remainder to give 100% by mass in total |

As the compound represented by Formula (I), a substance which is obtained by adjusting the addition amount of epoxy to be added to the alkyl group in order to obtain the compound shown in Table 1 below as the "main compound" was used.

<Evaluation>

With regard to the maintenance liquid thus obtained, the following evaluation was performed. The evaluation results are shown in Table 1 below.

(1) Solubility of Ink-Derived Solids

The black ink was forcibly applied, by spraying, to the surface of an inkjet recording head, to which water-repellency had been imparted by application of perfluorodecyltrichlorosilane (FDTS), and dried for one hour at room temperature. The dried solids on the head surface were observed using a microscope and recorded, and the diameter of the ink was determined. Thereafter, a maintenance liquid (cleaning liquid) coating unit described in JP-A No. 2011-73295 which generates a liquid column of a cleaning liquid (a coat layer of a cleaning liquid) was prepared, and on the coating unit, a maintenance liquid column was formed. The ejection head was allowed to pass across the maintenance liquid column at a velocity of 60 mm/sec, to thereby adhere the maintenance liquid onto the surface of the head. The degree of ink-derived solids remaining on this surface of the head was observed by a microscope. Evaluation of the solubility of the ink-derived solids was performed based on whether the ink with the above diameter before washing had been dissolved and disappeared after washing.

Generally, after applying a maintenance liquid to a head, wiping is conducted using cloth or the like; however, when undissolved ink remains, the ink may move to the ink ejection hole during wiping, and may block the ejection hole or accumulate in the vicinity of the hole, which causes unstable ejection. Therefore, without wiping, evaluation of the solubility of ink-derived solids was conducted according to the following evaluation criteria.

<Evaluation Criteria>

A: Ink-derived solids having a diameter of 12 μm or less are thoroughly dissolved.

B: Ink-derived solids having a diameter of 10 μm or less are thoroughly dissolved.

C: Ink-derived solids having a diameter of 7 μm or less are thoroughly dissolved.

D: Ink-derived solids having a diameter of 7 μm or less remain undissolved, and there is some possibility of being practically problematic.

E: Ink-derived solids having a diameter of less than 5 μm remain undissolved, which is practically problematic.

(2) Aggregating Property of Ink Mixed Liquid

The maintenance liquid and the black ink above were mixed at a weight ratio of 7:3, and with regard to the ink mixed liquid immediately after mixing and after leaving under an environment of 30° C. for 7 days, the volume average particle diameters were measured, and the difference (Δ) was determined from the following equation, to evaluate the aggregating property. The greater Δ means that aggregation proceeds with time, which is not preferable. In the following evaluation criteria, A to C are not practically problematic, D has a possibility of ejection problem, and E has a high possibility of ejection problem.

The measurement of the volume average particle diameter was carried out by the same method as the method for measuring the self-dispersing polymer particles B-01.

Difference in volume average particle diameter (Δ)=(volume average particle diameter after leaving under an environment of 30° C. for 7 days)−(volume average particle diameter immediately after mixing)

<Evaluation Criteria>

A: $\Delta \leq 5$ nm

B: 5 nm $< \Delta \leq$ 10 nm

C: 10 nm $< \Delta \leq$ 20 nm

D: 20 nm $< \Delta \leq$ 50 nm

E: 50 nm $< \Delta$, (3) Water Solubility of Ink Mixed Liquid after Being Dried

The maintenance liquid and the black ink above were mixed at a weight ratio of 7:3, and 10 μL of the mixed liquid were added dropwise onto a test piece coated with a water repellent film which was the same as the water repellent film coated on the head surface. After leaving the test piece under an environment of 25° C. and 80% for 24 hours, the test piece was dipped in 30 mL of water. With regard to the mixed liquid after being dried, the solubility in water was evaluated. When an undissolved substance is generated, there is a possibility that the undissolved substance may separate and adhere to the ejection port, which causes deterioration in ejection property with time.

<Evaluation Criteria>

A: The mixed liquid after being dried thoroughly dissolves in water.

B: An extremely slight amount of water-undissolved substance is generated.

C: Some water-undissolved substances can be seen, that is practically acceptable.

D: Water-undissolved substances can be seen, and there is a possibility of causing non-ejection when dried.

E: There are many water-undissolved substances, and thus there is a high possibility of being practically unacceptable.

TABLE 1

| Experimental | Compound Represented by Formula (I) | | | | Solubility of Ink-Derived | Aggregating Property of Ink Mixed | Water Solubility of Ink Mixed Liquid when | |
|---|---|---|---|---|---|---|---|---|
| Run No. | Main Compound | R1 | m | HLB Value | Solids | Liquid | Dried | Note |
| 1 | PEG (3) monopentyl ether | C5H11 | 3 | 12.0 | E | B | B | Comparative Example |
| 2 | PEG (2) monohexyl ether | C6H13 | 2 | 9.3 | C | D | D | Comparative Example |
| 3 | PEG (4) monohexyl ether | C6H13 | 4 | 12.7 | C | C | C | Invention |
| 4 | PEG (6) monohexyl ether | C6H13 | 6 | 14.4 | E | B | B | Comparative Example |
| 5 | PEG (3) monooctyl ether | C8H17 | 3 | 10.1 | A | D | D | Comparative Example |
| 6 | PEG (4) monooctyl ether | C8H17 | 4 | 11.5 | B | C | C | Invention |
| 7 | PEG (5) monooctyl ether | C8H17 | 5 | 12.6 | B | A | A | Invention |
| 8 | PEG (6) monooctyl ether | C8H17 | 6 | 13.4 | C | A | A | Invention |
| 9 | PEG (7) monooctyl ether | C8H17 | 7 | 14.1 | E | A | A | Comparative Example |
| 10 | PEG (3) monodecyl ether | C10H21 | 3 | 9.1 | A | E | D | Comparative Example |
| 11 | PEG (4) monodecyl ether | C10H21 | 4 | 10.5 | A | C | C | Invention |
| 12 | PEG (5) monodecyl ether | C10H21 | 5 | 11.6 | A | B | B | Invention |
| 13 | PEG (6) monodecyl ether | C10H21 | 6 | 12.5 | A | A | A | Invention |

TABLE 1-continued

| Experimental Run No. | Compound Represented by Formula (I) Main Compound | R1 | m | HLB Value | Solubility of Ink-Derived Solids | Aggregating Property of Ink Mixed Liquid | Water Solubility of Ink Mixed Liquid when Dried | Note |
|---|---|---|---|---|---|---|---|---|
| 14 | PEG (6) monodecyl ether | C10H21 | 6 | 12.5 | A | A | A | Invention |
| | PEG (7) monodecyl ether | C10H21 | 7 | 13.2 | | | | |
| 15 | PEG (7) monodecyl ether | C10H21 | 7 | 13.2 | B | A | A | Invention |
| 16 | PEG (8) monodecyl ether | C10H21 | 8 | 13.8 | C | A | A | Invention |
| 17 | PEG (10) monodecyl ether | C10H21 | 10 | 14.7 | D | A | A | Comparative Example |
| 18 | PEG (15) monodecyl ether | C10H21 | 15 | 16.1 | E | A | A | Comparative Example |
| 19 | PEG (6) monolauryl ether | C12H25 | 6 | 11.7 | A | C | C | Invention |
| 20 | PEG (8) monolauryl ether | C12H25 | 8 | 13.1 | A | C | C | Invention |
| 21 | PEG (10) monolauryl ether | C12H25 | 10 | 14.1 | D | B | B | Comparative Example |
| 22 | PEG (6) cetyl ether | C16H33 | 6 | 10.4 | A | E | E | Comparative Example |
| 23 | PEG (8) cetyl ether | C16H33 | 8 | 11.8 | A | C | C | Invention |
| 24 | PEG (10) cetyl ether | C16H33 | 10 | 12.9 | A | C | C | Invention |
| 25 | PEG (12) cetyl ether | C16H33 | 12 | 13.7 | B | B | B | Invention |
| 26 | PEG (10) oleyl ether | C18H35 | 10 | 12.4 | A | C | C | Invention |
| 27 | PEG (14) icosyl ether | C20H41 | 14 | 13.5 | B | C | C | Invention |
| 28 | PEG (14) docosyl ether | C22H45 | 14 | 13.1 | B | E | D | Comparative Example |
| 29 | PEG (10) nonylphenyl ether | C15H23 | 10 | 13.2 | B | C | C | Invention |
| 30 | PEG (10) octylphenyl ether | C14H21 | 10 | 13.5 | C | C | C | Invention |
| 31 | not added | | | — | E | A | A | Comparative Example |

In experimental run No. 14, a 1:1 mixture of PEG (6) monodecyl ether and PEG (7) monodecyl ether was used.

As shown in Table 1 above, in the compositions according to the invention, which include a compound represented by Formula (I) and having an HLB value of from 10.5 to 13.8 and a water-soluble organic solvent represented by Formula (II), maintenance liquids, which exhibited excellent properties in terms of solubility of ink-derived solids, aggregating property of ink mixed liquid, and water solubility of ink mixed liquid when dried, were obtained.

Among the compounds that have an HLB value of from 10.5 to 13.8 and are represented by Formula (I), the compounds in which $R^1$ represents an octyl group or a decyl group were more preferable. Particularly, when the compound in which $R^1$ represents a decyl group was used, more preferable results were obtained.

Further, among the compounds that have an HLB value of from 10.5 to 13.8 and are represented by Formula (I), when a compound in which the number of carbon atoms of $R^1$ is small was used, there was a tendency that the solubility of ink-derived solids is lowered, whereas when a compound in which the number of carbon atoms of $R^1$ is great was used, there was a tendency that the aggregating property of the ink mixed liquid and the water solubility of the ink mixed liquid when dried are lowered.

Example 2

Preparation of Maintenance Liquid

Preparation of maintenance liquids was conducted in the same manner as that in the preparation of the maintenance liquid of "No. 13" in Example 1, except that, DEGmBE used as the solvent in the composition in the preparation of No. 13 and DEG used as the moisturizing agent in the preparation of No. 13 were changed to the equivalent mass of compounds shown in the following Table 2, respectively. Evaluation was performed similar to Example 1.

TABLE 2

| Experimental Run No. | Water-Soluble Organic Solvent | Moisturizing Agent | Solubility of Ink-Derived Solids | Aggregating Property of Ink Mixed Liquid | Water Solubility of Ink Mixed Liquid when Dried | Note |
|---|---|---|---|---|---|---|
| 13 | DEGmBE | DEG | A | A | A | Invention |
| 32 | TEGmBE | DEG | B | C | C | Invention |
| 33 | DEGmEE | DEG | B | B | B | Invention |
| 34 | DPGmME | DEG | C | C | C | Invention |
| 35 | DEGmBE | Glycerin | B | B | B | Invention |
| 36 | DEGmBE | DPG | C | C | C | Invention |
| 37 | DEGmBE | PG | C | C | C | Invention |
| 38 | DEGmBE | TEG | B | B | B | Invention |
| 39 | DEGmBE | not added | B | D | E | Comparative Example |

TABLE 2-continued

| Experimental Run No. | Water-Soluble Organic Solvent | Moisturizing Agent | Solubility of Ink-Derived Solids | Aggregating Property of Ink Mixed Liquid | Water Solubility of Ink Mixed Liquid when Dried | Note |
|---|---|---|---|---|---|---|
| 40 | not added | DEG | D | B | A | Comparative Example |

The details of the kinds of solvents described in Table 2 above are as follows.

DEGmBE: diethylene glycol monobutyl ether
TEGmBE: triethylene glycol monobutyl ether
DEGmEE: diethylene glycol monoethyl ether
DPGmME: dipropylene glycol monomethyl ether
DEG: diethylene glycol
DPG: dipropylene glycol
PG: propylene glycol
TEG: triethylene glycol

Example 3

<Preparation of Maintenance Liquid>

Preparation of maintenance liquids was conducted in substantially the same manner as that in the preparation of the maintenance liquid of "No. 13" in Example 1, except that, in the preparation of No. 13, the addition amounts of DEGmBE as the solvent in the composition and DEG as the moisturizing agent were each changed as shown in the following Table 3. Evaluation was performed similar to Example 1.

TABLE 3

| Experimental Run No. | Addition Amount of DEGmBE (% by mass) | Addition Amount of DEG (% by mass) | Mass Ratio of DEGmBE:DEG | Solubility of Ink-Derived Solids | Aggregating Property of Ink Mixed Liquid | Water Solubility of Ink Mixed Liquid when Dried | Note |
|---|---|---|---|---|---|---|---|
| 13 | 5 | 25 | 1:5 | A | A | A | Invention |
| 41 | 0.3 | 30 | 1:100 | C | A | A | Invention |
| 42 | 3 | 27 | 1:9 | B | A | A | Invention |
| 43 | 7.5 | 22.5 | 1:3 | A | A | A | Invention |
| 44 | 10 | 20 | 1:2 | A | B | B | Invention |
| 45 | 15 | 15 | 1:1 | A | C | C | Invention |
| 46 | 5 | 30 | 1:6 | B | B | B | Invention |
| 47 | 5 | 50 | 1:10 | C | B | B | Invention |

As shown in Table 3, in the compositions according to the invention, in which the mass ratio of DEGmBE to DEG (DEGmBE:DEG) is from 1:2 to 1: 9, and further, from 1:3 to 1:5, maintenance liquids, which exhibited excellent properties in terms of solubility of ink-derived solids, aggregating property of ink mixed liquid, and water solubility of ink mixed liquid when dried, were obtained.

Example 4

<Preparation of Colored Ink>

Magenta ink (M-21), cyan ink (C-21), yellow ink (Y-21), and black ink (K-21), which are described in paragraph [0221], Table 2, and Table 3 of JP-A No. 2011-46908, were prepared.

<Preparation of Treatment Liquid>

The components of the following composition were mixed to prepare a treatment liquid. Concerning the physical properties of the treatment liquid, the viscosity was 2.6 mPa·s, the surface tension was 41.0 mN/m, and the pH (at 25° C.) was 0.7. Note that, the viscosity was measured using a VISCOMETER TV-22 (manufactured by TOKI SANGYO CO., LTD.) under the condition of 20° C. The surface tension was measured using an AUTOMATIC SURFACE TENSIOMETER CBVP-Z (manufactured by Kyowa Interface Science Co. Ltd.) under the condition of 25° C.

(Composition of Treatment Liquid)

| | |
|---|---|
| TPGmME | 4.8% by mass |
| DEGmBE (diethylene glycol monobutyl ether) | 4.8% by mass |
| Malonic acid | 9.0% by mass |
| Malic acid | 7.8% by mass |
| 85% by mass aqueous solution of phosphoric acid | 6.7% by mass |
| 1,2,3-Propanetricarboxylic acid | 2.5% by mass |
| Water-soluble polymer 1 shown below | 0.6% by mass |
| Benzotriazole | 1.5% by mass |
| TSA-739 (manufactured by Momentive Performance Materials Japan LLC; antifoaming agent) | 100 ppm as the amount of silicone oil |

-continued

| | |
|---|---|
| Ion exchanged water | Remainder to give 100% by mass in total |

Water-soluble polymer 1

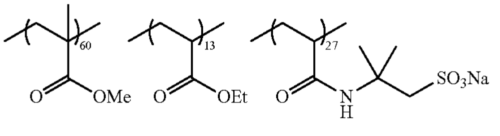

(Mw = 45000)

<Preparation of Maintenance Liquid>

The components of the following composition were mixed, thereby preparing a maintenance liquid. The viscosity of the maintenance liquid was 3.1 (at 25° C.), and the pH was adjusted to 8.4, using nitric acid. Measurement of viscosity was conducted similar to Example 1.

(Composition of Maintenance Liquid)

| | |
|---|---|
| DEGmBE (water-soluble organic solvent represented by Formula (II)) | 7.0% by mass |
| DEG (moisturizing agent) | 23.0% by mass |
| Imidazole (pKa = 7.0, basic compound) | 0.5% by mass |
| Benzotriazole | 0.1% by mass |
| SNOWTEX XS (manufactured by Nissan Chemical Industries, Ltd.; colloidal silica) | 0.1% by mass |
| Compound represented by Formula (I) shown in Table 4 below | 3.0% by mass |
| Ion exchanged water | Remainder to give 100% by mass in total |

<Image Formation and Evaluation>

A. Image Formation

An inkjet recording apparatus shown in FIG. 1 was prepared, and an ink image was formed by ejecting the colored inks of 4 colors in a manner as described below. As the recording medium, OK TOPCOAT PLUS (manufactured by Oji Paper Co., Ltd.) having a basis amount of from 104 g/m$^2$ to 154 g/m$^2$ was used. The image formation conditions were as follows: the resolution was 1,200 dpi (dot per inch)×1,200 dpi and the ejected liquid droplet amount was an amount corresponding to 3 pL.

The colored inks of 4 colors, the treatment liquid, and the maintenance liquid, which had been prepared in advance, were charged into the inkjet recording apparatus 1 shown in FIG. 1.

In FIG. 1, 1 represents an inkjet recording apparatus, 10 represents a paper supply unit, 12 represents a treatment liquid application unit, 14 represents an imaging unit, 16 represents a drying unit, 18 represents a fixing unit, 20 represents a discharge unit, 22 represents a recording medium, 24 represents a first intermediate transporting unit, 26 represents a second intermediate transporting unit, 28 represents a third intermediate transporting unit, 30 represents an intermediate transporting body, 32 represents a transporting guide, 50 represents a feeder board, 52 represents a paper supplying cylinder, 70 represents an imaging drum, 72C, 72M, 72Y, and 72K each represent an ink head, 76 represents a drying drum, 84 represents a fixing drum, 86 represents a first fixing roller, 88 represents a second fixing roller, 90 represents an in-line sensor, 92 represents a paper sheet discharge table, 94 represents a chain delivery sprocket, 96 represents a chain for chain delivery, and 98 represents an outer cover of the apparatus.

The inkjet recording apparatus was started up, and the treatment liquid was coated onto the entire surface of the recording medium 22, which was sent from the paper supply unit 10, wherein the coating was performed on a treatment liquid drum 54 (450 mm in diameter) by using a treatment liquid coating device 56, to give a thin film (2 μm in thickness). In this process, a gravure roller was used for the treatment liquid coating device 56.

Subsequently, the recording medium 22 that had been coated with the treatment liquid was subjected to drying processing by using a hot air discharge nozzle 58 (spraying 70° C. hot air (at 9 m$^3$/min)) and an IR heater 60 (at 180° C.), whereby a portion of the solvent in the treatment liquid was dried.

This recording medium 22 was conveyed to the imaging unit 14 via the first intermediate transporting unit 24, and according to the image signals for solid images of the respective colors, the colored inks of CMY (cyan, magenta, and yellow) were each ejected from the ejection heads 72Y, 72M, and 72C, respectively, to spot the inks imagewise on the recording medium. The ink ejection volume was set to 1.4 pL at highlight areas and 3 pL (2 drops) at high-density areas, and the recording density was adjusted to be recorded at 1,200 dpi for both the main scanning direction and the sub-scanning direction. In this process, in a case in which non-ejection nozzles occurred, a treatment for making it difficult to see the streaked unevenness due to non-ejection was performed by using a nozzle adjacent to the non-ejection nozzle employing an ejection volume of 5 pL (3 drops). Further, the treatment liquid drum 54 and the drying drum 76 were disposed independently from the imaging drum 70, and thus, even in the case of performing drying of the treatment liquid at a high speed, the imaging unit was free from an adverse influence of heat or air for drying, and stable ejection was attained.

Subsequently, on the drying drum 76, drying was conducted by using a first IR heater 78 (surface temperature of 180° C.), a hot air discharge nozzle 80 (70° C. hot air with air quantity of (12 m$^3$/min)), and a second IR heater 82 (surface temperature of 180° C.). The drying time is about two seconds.

Next, the recording medium 22, on which an image had been formed, was heated and fixed at a nip pressure of 0.30 MPa, by using a 50° C. fixing drum 84, an 80° C. first fixing roller 86, and a second fixing roller 88. In this process, as each of the first fixing roller 86 and the second fixing roller 88, a roller prepared by disposing silicone rubber having a hardness of 30° at a thickness of 6 mm on a core metal made of metal and then subjecting this to soft PFA coating (50 μm in thickness), to thereby exhibit excellent adhesion and excellent peeling properties with respect to ink images, was used.

Here, the recording medium 22 was adjusted so as to be conveyed at a conveying speed of 535 mm/s by drum transportation using drums 54, 70, 76, and 84.

Through performing the above processes, an evaluation sample of a recording medium having an image formed thereon was obtained.

Next, after the completion of the ejection of ink, the maintenance liquid described below, which had been charged into the inkjet recording apparatus, was applied onto the nozzle face of the head from the maintenance liquid coating unit. Then, the nozzle face of the ejection head, on which plural ejection holes are arranged, was wiped using a TORAYSEE (registered trademark).

B. Evaluation 2

Using the maintenance liquid obtained, the following evaluation of maintenance properties was performed. The evaluation results are shown in Table 4 below.

<Maintenance Properties>

In forming an image as described above, ejection and the like were carried out under the condition shown in the following (1) to (3), and re-ejection properties after the operation were evaluated, and judgment of acceptance with regard to the maintenance property was performed. From the results of the judgment of acceptance, maintenance properties were evaluated according to the following evaluation criteria.

—Conditions for Ejection and the Like, and Acceptance and Rejection Criteria—

(1) The ink is continuously ejected for 45 minutes, and immediately after the completion of the ejection, the maintenance liquid is applied to the nozzle face of the ejection head, and wiping is carried out once. In a case in which the ink ejection ratio after the operation is 90% or higher, the maintenance property is judged to be acceptable.

(2) The ink is continuously ejected for 5 minutes, and then, the ejection is stopped for 30 minutes, and after the pause, the maintenance liquid is applied to the nozzle face of the ejection head, and wiping is carried out once. In a case in which the ink ejection ratio after the operation is 90% or higher, the maintenance property is judged to be acceptable.

(3) The ink is continuously ejected for 5 minutes, and immediately after the completion of the ejection, the maintenance liquid is applied to the nozzle face of the ejection head, and wiping is carried out once. Then, the ejection head is left as it is for 45 minutes. Thereafter, in a case in which the ink ejection ratio is 90% or higher, the maintenance property is judged to be acceptable.

—Measurement of Ink Ejection Ratio—

At the time of the initiation of the ink ejection, it was confirmed that the ink was ejected from all of the nozzles. Then, after wiping, the number of ejecting nozzles was counted, and the ejection ratio was calculated according to the following equation.

Ejection ratio (%)=(number of ejecting nozzles after wiping)/(total number of nozzles)×100

<Evaluation Criteria>

A: Acceptable in all of the three items (1) to (3)
B: Acceptable in two of the items (1) to (3)
C: Acceptable only in one of the items (1) to (3)
D: Not acceptable in all of the three items (1) to (3)

TABLE 4

| Experimental | Compound | | | HLB | Maintenance | |
|---|---|---|---|---|---|---|
| Run No. | Compound Name | R1 | m | Value | Properties | Note |
| 48 | PEG (6) monodecyl ether | C10H21 | 6 | 12.5 | A | Invention |
| 49 | PEG (5) monooctyl ether | C8H17 | 5 | 12.6 | B | Invention |
| 50 | not added | | | — | D | Comparative Example |

Example 5

Preparation of a maintenance liquid was conducted in the same manner as that in the preparation of the maintenance liquid of "No. 48" in Example 4, except that, the imidazole used in the composition of No. 48 was removed.

In this maintenance liquid, after aging at 60° C. for 7 days, lowering of pH occurred. Using this maintenance liquid, evaluation of maintenance properties was performed in the same manner similar as in Example 4, and it was found that the maintenance properties were deteriorated.

This lowering of pH was more significant when the compound (surfactant) represented by Formula (I) above was added, and thus, it was confirmed that deterioration of maintenance properties is prevented by the addition of imidazole.

Example 6

In the preparation of the maintenance liquid of "No. 48" in Example 4, as the anti-foaming agent, BYK-012, 017, 021, 022, 024, 025, 038, 094 (all manufactured by BYK-Chemie Japan), KS-537, KS-604, KM-72F (all manufactured by Shin-Etsu Chemical Co., Ltd.), TSA-739 (manufactured by Momentive Performance Materials Japan LLC), or OLFINE AF104 (manufactured by Nissin Chemical Industry Co., Ltd.) was added in an amount of 0.1% by mass, and evaluations of maintenance properties and frequency of occurrence of streaks after maintenance were performed.

As a result, it was confirmed that favorable effects on the maintenance properties and occurrence of streaks after maintenance can be obtained by the addition of these anti-foaming agents. It was confirmed that when the compound represented by Formula (I) according to the invention is used, foaming tends to occur easily; however, particularly, by the addition of BYK-024, which is a water-based silicone antifoaming agent, most preferable effects on both the maintenance properties and occurrence of streaks after maintenance can be obtained.

The disclosure of Japanese Patent Application No. 2012-122537 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A maintenance liquid for inkjet recording, the maintenance liquid comprising:

a compound represented by the following Formula (I) and having an HLB value of from 10.5 to 13.8;

a water-soluble organic solvent represented by the following Formula (II);

a moisturizing agent; and water:

$$R^1—O—(CH_2CH_2O)_m—H \qquad \text{Formula (I)}$$

wherein, in Formula (I), $R^1$ represents a straight chain or branched alkyl group having from 6 to 20 carbon atoms, a straight chain or branched alkenyl group having from 6 to 20 carbon atoms, or an aryl group; and m represents an integer from 3 to 14;

$$R^3—(OR^4)_x—OR^5 \qquad \text{Formula (II)}$$

wherein, in Formula (II), each of $R^3$ and $R^5$ independently represents a hydrogen atom or an alkyl group having from 1 to 4 carbon atoms, provided that $R^3$ and $R^5$ never represent a hydrogen atom at the same time; $R^4$ represents an ethylene group or a propylene group; and x represents an integer from 1 to 4.

2. The maintenance liquid for inkjet recording according to claim 1, wherein, in Formula (I), $R^1$ represents a straight chain or branched alkyl group having from 8 to 10 carbon atoms.

3. The maintenance liquid for inkjet recording according to claim 1, wherein a total content of the water-soluble organic solvent and the moisturizing agent is from 20% by mass to 40% by mass with respect to a total amount of the maintenance liquid for inkjet recording, and a mass ratio of the water-soluble organic solvent to the moisturizing agent [water-soluble organic solvent: moisturizing agent] is from 1:1 to 1:100.

4. The maintenance liquid for inkjet recording according to claim 1 further comprising a basic compound having a pKa value of from 6.0 to 8.5.

5. The maintenance liquid for inkjet recording according to claim 1 further comprising a silicone based antifoaming agent.

6. An ink set for inkjet recording, the ink set comprising:

an ink composition that includes a pigment, polymer particles, and water; and the maintenance liquid for inkjet recording according to claim 1.

7. The ink set for inkjet recording according to claim 6 further comprising a treatment liquid containing an aggregating component that causes aggregation of components in the ink composition.

8. An image forming method using the ink set for inkjet recording according to claim 6 and comprising:

applying the ink composition to a recording medium by ejecting the ink composition from an inkjet recording head; and removing the ink composition that has adhered to the inkjet recording head by using the maintenance liquid for inkjet recording.

9. The image forming method according to claim 8 further comprising a treatment liquid application process of applying, to the recording medium, a treatment liquid containing an aggregating component that causes aggregation of components in the ink composition.

10. A maintenance method comprising: applying the maintenance liquid for inkjet recording according to claim 1 to an ink ejection head for inkjet recording, to which an ink composition has adhered, thereby removing the ink composition on the inkjet recording head.

* * * * *